United States Patent
Lamba et al.

(10) Patent No.: US 12,040,945 B2
(45) Date of Patent: Jul. 16, 2024

(54) NON-DETERMINISTIC FINITE AUTOMATA TREE STRUCTURE APPLICATION APPARATUS AND METHOD

(71) Applicant: RAKUTEN MOBILE, INC., Tokyo (JP)

(72) Inventors: Surender Singh Lamba, Tokyo (JP); Mihirraj Narendra Dixit, Tokyo (JP); Abhishek Sharma, Tokyo (JP); Bharath Rathinam, Tokyo (JP); Rahul Atri, Singapore (SG)

(73) Assignee: RAKUTEN MOBILE INC., Tokyo (JP)

( * ) Notice: Subject to any disclaimer, the term of this patent is extended or adjusted under 35 U.S.C. 154(b) by 454 days.

(21) Appl. No.: 17/505,635

(22) Filed: Oct. 20, 2021

(65) Prior Publication Data

US 2023/0059360 A1  Feb. 23, 2023

Related U.S. Application Data

(60) Provisional application No. 63/230,080, filed on Aug. 6, 2021.

(51) Int. Cl.
*H04L 41/0894* (2022.01)
*H04L 41/0631* (2022.01)
*H04W 48/18* (2009.01)

(52) U.S. Cl.
CPC ...... *H04L 41/0894* (2022.05); *H04L 41/0631* (2013.01); *H04W 48/18* (2013.01)

(58) Field of Classification Search
None
See application file for complete search history.

(56) References Cited

U.S. PATENT DOCUMENTS

| | | | | |
|---|---|---|---|---|
| 7,043,659 | B1* | 5/2006 | Klein | H04L 41/0893 714/26 |
| 7,606,895 | B1* | 10/2009 | Dini | H04L 41/0893 709/224 |
| 11,159,360 | B2* | 10/2021 | Ajmera | H04L 41/06 |
| 11,271,969 | B2* | 3/2022 | Pitre | H04L 63/20 |
| 11,563,625 | B1* | 1/2023 | Dixit | G06N 5/013 |
| 11,706,154 | B2* | 7/2023 | Parikh | H04L 47/83 709/226 |
| 2011/0137942 | A1 | 6/2011 | Yan et al. | |
| 2011/0138035 | A1 | 6/2011 | Dahl | |

(Continued)

*Primary Examiner* — Quang N Nguyen
(74) *Attorney, Agent, or Firm* — HAUPTMAN HAM, LLP

(57) ABSTRACT

A method includes processing event data to detect a status of a network function. The event data is processed based on two or more conditions defined by a correlation policy. The correlation policy includes a non-deterministic finite automata tree (NFAT) structure correlation policy having a policy type. The method also includes determining a first value of a first condition of the two or more conditions. The method further includes determining a second value of a second condition of the two or more conditions. The method additionally includes determining the policy type of the NFAT structure correlation policy. The method also includes determining whether the first value is greater than a first preset value indicative of whether the first condition is satisfied. The method further includes determining whether the second value is greater than a second preset value indicative of whether the second condition is satisfied.

20 Claims, 11 Drawing Sheets

(56) References Cited

U.S. PATENT DOCUMENTS

| | | |
|---|---|---|
| 2011/0173232 A1 | 7/2011 | Beylin |
| 2014/0059555 A1 | 2/2014 | Bacher et al. |
| 2019/0215340 A1 | 7/2019 | Klaedtke |
| 2020/0228391 A1* | 7/2020 | Ajmera ............... H04L 41/0681 |

* cited by examiner

NON-DETERMINISTIC FINITE AUTOMATA TREE STRUCTURE APPLICATION APPARATUS AND METHOD

PRIORITY CLAIM AND CROSS-REFERENCE

This application claims priority to Provisional Application No. 63/230,080, filed Aug. 6, 2021, which is hereby incorporated by reference in its entirety.

BACKGROUND

Network service providers and device manufacturers (e.g., wireless, cellular, etc.) are continually challenged to deliver value and convenience to consumers by, for example, providing compelling network services that are dependable and capable of being flexibly constructed, scalable and diverse.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
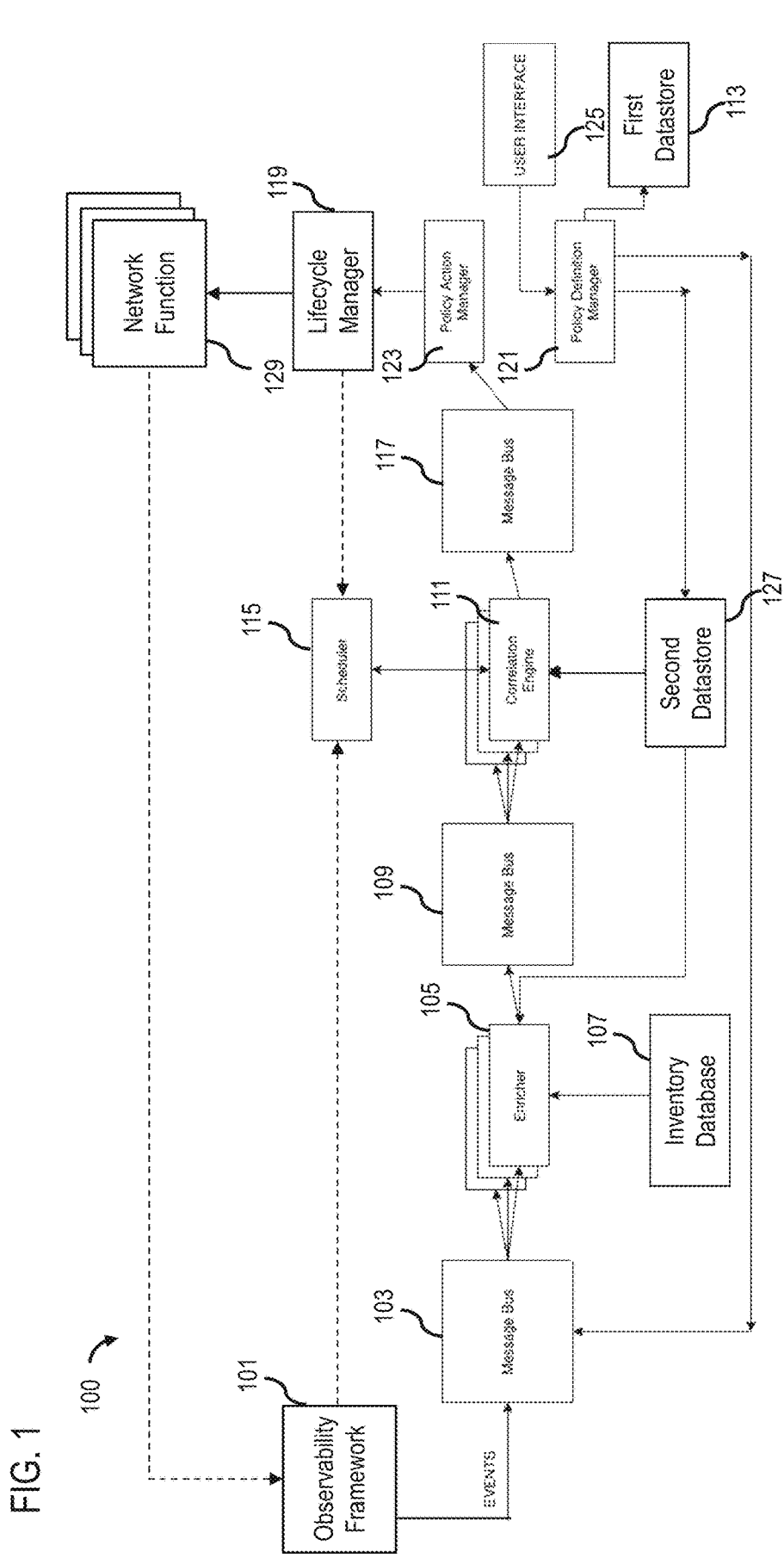
FIG. 1 is a diagram of a correlation policy application and management system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows may include embodiments in which the first and second features are formed or positioned in direct contact, and may also include embodiments in which additional features may be formed or positioned between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of an apparatus or object in use or operation in addition to the orientation depicted in the figures. The apparatus may be otherwise oriented (rotated 90 degrees or at other orientations) and the spatially relative descriptors used herein may likewise be interpreted accordingly.

Network services are often provided by static or inflexible systems that are difficult to configure, scale, and deploy over various target areas. Dependable network systems and/or network services that are capable of being flexibly constructed, scalable and diverse are often dependent on automating the collection, analysis and reporting of information regarding multiple network functions, network services, network devices, etc. that affect the performance, accessibility, configuration, scale, and/or deployment of a communication network, various network functions, network services, and the like.

Conventional network systems are often incapable or fail to efficiently determine the status of a network that involves complex working conditions such as (i) multiple conditions that include conditions for ordered events, conditions for unordered events, and a combination thereof, (ii) conditions for significant quantities of events, or a combination of (i) and (ii).

FIG. 1 is a diagram of a correlation policy application and management system 100, in accordance with one or more embodiments.

Non-deterministic finite automata tree (NFAT) structure is a type of structure that comprises multiple transition states. The NFAT structure can be an array structure comprising multiple columns, a tree structure comprising multiple leaves, a combination of one or more array structures and one or more tree structures, or some other suitable elements. As will be further discussed in below, evaluation of a NFAT structure allows a system to evaluate to any combination of states which cannot be pre-determined, thereby allowing an evaluation of complex network condition with minimal effort. Specifically, NFAT evaluation executed by system 100 facilitates simultaneous correlation of policies of multiple events or simultaneous correlation of multiple types of policies, thereby enabling the system 100 to monitor the status of a network that involves multiple network functions and complex conditions.

The system 100 makes it possible to collect, analyse, and report information regarding multiple network functions, network services, network devices, etc. that affect the performance, accessibility, configuration, scale, and/or deployment of a communication network, various network functions, network services, and the like. In some embodiments, the system 100 causes one or more operations or actions to occur based on the analysis and/or reporting of the collected information. In some embodiments, the system 100 is configured to observe complex patterns and is capable of specifying if a group of events occur or did not occur after an event.

In some embodiments, the system 100 provides the capability for massively parallel streaming analytics, storage and fast access of data and cached information, even for topology or contextual data enrichment cache timeouts. In some embodiments, the system 100 provides an ability to setup custom functions, rules, and/or timing associated with determining compliance with one or more rules, implementing one or more rules and/or causing one or more processes to occur based on one or more rules. The system 100 is configured to minimize system resource consumption and processing times while increasing a quantity of data streams and correlation policies that are monitored and managed as compared to conventional correlation architectures that facilitate multi-stream creation and/or processing.

As shown in FIG. 1, the system 100 comprises an observability framework 101, a first message bus 103, one or more data enrichers 105, an inventory database 107, a second message bus 109, one or more correlation engines 111, a first datastore 113, a scheduler 115, a third message bus 117, a lifecycle manager 119, a policy definition manager 121, a policy action manager 123, a user interface 125 and a second datastore 127. It is contemplated that the functions of these components may be combined in one or more components or performed by other components of equivalent functionality. In some embodiments, various components of system 100 individually, or together, are implemented as a set of computer readable instructions that, when executed by a processor such as a processor 1103 (FIG. 11), facilitates the processes discussed with respect to one or more embodiments. In some embodiments, the system 100 is a pluggable correlation architecture.

The observability framework 101 is communicatively coupled with one or more network devices, terminals, nodes, antennas, databases, operating systems, directories, firewalls, detection systems, applications, mainframes, application servers, bare metal monitor, cluster, or other suitable data source capable of generating information that can be processed into event data usable to determine a status of one or more network functions 129. The one or more network functions 129 are associated with operating a communication network. In some embodiments, a network function 129 corresponds to an operation or service performed or provided by one or more hardware components of a communication network, one or more software components of a communication network, or a combination thereof.

The observability framework 101 sends the event data to the first message bus 103. The first message bus 103 is communicatively coupled with the policy definition manager 121 and is configured to send the event data received from the observability framework 101 to the one or more data enrichers 105. The first message bus 103 is configured to send the event data to the one or more data enrichers 105 based on a correlation policy. The correlation policy is communicated to the first message bus 103 by the policy definition manager 121.

The policy definition manager 121 is connected to the first datastore 113 and to the second datastore 127. The first datastore 113 comprises a plurality of rules associated with monitoring and modifying the one or more network functions 129. The policy definition manager 121 is configured to generate the correlation policy based, at least in part, on one or more of the rules stored in the first datastore 113 and cause the correlation policy to be stored in the second datastore 127.

The one or more data enrichers 105 are configured to format the event data based on one or more of at least one template stored in the inventory database 107 or the one or more rules included in the correlation policy stored in the second datastore 127 to generate enriched data. In some embodiments, a template is based on a set of instructions for formatting event data by one or more of aggregating, parsing, normalizing, filtering, adding, or deleting information from the event data to achieve a format defined by the template.

The second message bus 109 sends the enriched data to the one or more correlation engines 111 based on the one or more rules. In some embodiments, the second message bus 109 is excluded from the system 100 and the one or more data enrichers 105 are configured to directly send the enriched data to one or more of the correlation engines 111.

The one or more correlation engines 111 are configured to process the enriched data based on the one or more rules to determine whether the event data satisfies one or more conditions defined by the correlation policy. The one or more correlation engines 111 are also configured to generate one or more outputs indicative of whether the event data satisfies the one or more conditions defined by the correlation policy.

The third message bus 117 is configured to send at least one of the one or more outputs generated by the one or more correlation engines to the policy action manager 123. In some embodiments, the third message bus 117 is excluded from the system 100 and the one or more correlation engines 111 are configured to directly send a generated output to the policy action manager 123.

The policy action manager 123 is communicatively coupled with the lifecycle manager 119 and is configured to trigger an operation to be performed by the lifecycle manager 119. The operation that is performed by the lifecycle manager 119 is associated with monitoring and modifying the one or more network functions 129 based on the at least one output of the one or more outputs. In some embodiments, the operation that is performed by the lifecycle manager 119 is defined by the correlation policy as an action caused to occur based on an outcome of the determination of whether the event data satisfies the one or more conditions defined by the correlation policy.

In some embodiments, correlation engine 111 processes event data received from the observability framework 111 to detect a status of a network function 129. The event data, in this example, is processed based on a correlation policy stored in second data store 127, wherein the correlation policy defines two or more conditions. In some embodiments, the correlation policy is at least partially defined by a non-deterministic finite automata (NFA) data structure that is evaluated to solve one or more ordered policies, unordered policies, or a combination thereof. In some embodiments, to facilitate dynamic and parallel solving of ordered and/or unordered policies, the correlation policy is at least partially defined by a NFATree (NFAT) data structure that is evaluated.

The NFAT structure correlation policy has a policy type that is one of any predefined policy type that is capable of being processed by the correlation engine 111. In some embodiments, the predefined policy type is one of a strict contiguous (SC) policy, a strict non-contiguous (SNC) policy, a relaxed contiguous (RC) policy, or a relaxed non-contiguous (RNC) policy. In some embodiments, a NFAT structure correlation policy includes one or more portions that are a combination of two or more different policy types. In some embodiments, a NFAT structure correlation policy includes multiple policies of a same policy type.

For strict and/or relaxed policy types, the correlation engine 111 processes the event data to determine if events indicated in an event stream occur in a predefined order. Based on these criteria, the correlation engine 111 determines whether an array or a tree structure should be created.

For a strict policy type, the events in the event stream are required to occur in a predefined order. In this situation, correlation engine 111 determines that one or more arrays will be created as the correlation policy is satisfied.

For example, a condition of Strict (A, B) indicates an order of events "A first and B later." When the correlation engine 111 processes the event stream, if the first event in the event stream is A, then the order of "A first and B later" is at least partially fulfilled and thus an array will be created and the number of A in said array will be increased from "0" into "1". If the subsequent event in the event stream is (i) A, in a contiguous situation, the number of A in said array will be increased from "1" into "2"; otherwise, in a non-contiguous situation, a new array will be created and the number of A in the new array will be increased from "0" to "1"; or (ii) B, then the number of B in said array will be increased from "0" into "1".

In some embodiments, the event data is formatted and/or filtered by the one or more data enrichers 105 before being sent to the correlation engine 111 for processing based on the correlation policy to facilitate processing of policy related events (e.g., event A and event B) only, while preventing non-policy related events from being sent to the correlation engine 111.

On the other hand, if the first event in the event stream is not A, then the order of "A first and B later" is not fulfilled and no array will be created. If the subsequent event in the event stream is (i) A, then an array will be created and the process as described above will be carried out; or (ii) any event other than A, then no array will be created, and the correlation engine 111 will proceed to process a next event in the event stream if the correlation engine 111 is within a hold time, for example.

For a relaxed policy type, the events indicated in an event stream can occur in any order. Based on these criteria, the correlation engine 111 determines one or more tree structures with corresponding leaf/leaves will be created.

For example, assuming a condition of Relaxed (A, B), if the event stream contains event A and/or event B, the correlation engine 111 will create a tree structure with two leaves (a first leaf for event A and a second leaf for event B). When the correlation engine 111 processes the event stream, if the event stream contains event A, then the number of A in the first leaf will be increased on the order of 1 (e.g., if there are two events A in the event stream, in a contiguous situation, the number of A in the first leaf will be increased to 2; and in a non-contiguous situation, when the condition associated with A is not yet satisfied (e.g., a condition of "A>2"), the number of A in the first leaf will be increased to 2, when the condition associated with A is satisfied (e.g., a condition of "A>0"), a new tree with two leaves will be created and the number of A in the first leaf of the new tree will be increased from "0" to "1"). The correlation engine 111 performs similar processes for event B.

For contiguous/non-contiguous policy types, the correlation engine 111 processes the event data to determine if the events indicated in an event stream occur adjacent to similar events. Based on this criteria, the correlation engine 111 determines whether the event should be included in one NFAT data structure (e.g., array structure, tree structure, etc.), or whether the correlation engine 111 should create a NFAT data structure for the event.

For a "contiguous" situation, the events in an event stream should be adjacent to similar events. In this situation, when multiple similar events are included in the event stream, the correlation engine 111 groups or includes multiple similar events into a same array/same leaf of one tree structure, so that they are adjacent to each other.

For example, a condition of Contiguous (A, B) indicates that an event A should be adjacent to one or more other events A and/or an event B should be adjacent to one or more other event B. In this regard, if the event stream contains multiple events A, the correlation engine 111 includes multiple events A in a same array or a same leaf of a same tree, and the number of A in the array/the leaf will increase on the order of 1 until an operation is caused to occur by the correlation engine 111 and the array/the tree is deleted by the correlation engine 111. The correlation engine 111 performs similar processes for event B.

In a "non-contiguous" situation, the events in an event stream are not required to be adjacent to the similar event. Thus, when the event stream contains multiple similar events and the condition defined by the policy is partially matched, the correlation engine 111 creates multiple NFAT data structures.

For example, if the event stream contains 2 events $A_1$ and $A_2$, then the correlation engine 111 creates a first NFAT data structure (e.g., array structure, tree structure, etc.) for $A_1$ and then creates a second NFAT data structure (e.g., array structure, tree structure, etc.) for $A_2$ when the condition associated with $A_1$ in the first NFAT data structure is matched. The correlation engine 111 performs similar processes for event B.

In some embodiments, one or more policies defining Strict/Relaxed conditions can be combined with one or more policies defining Contiguous/Non-Contiguous conditions to form one or more combined policies. For example, said combined policies can be any of a strict contiguous (SC) policy, a strict non-contiguous (SNC) policy, a relaxed contiguous (RC) policy, a relaxed non-contiguous (RNC) policy, or a combination thereof. For example, various policy types can be optionally combined with each other to form a more complex policy, such as a RC of SNC policy, or some other suitable combination of policy types.

The correlation engine 111 determines a first value of a first condition of the two or more conditions, a second value of a second condition of the two or more conditions, and the policy type of the correlation policy. The correlation engine 111 optionally determines an order of the two or more conditions based on a determination that the correlation policy is a policy type for which an order of the two or more conditions matters to determine whether the correlation policy or conditions thereof are satisfied. In some embodiments, the correlation engine 111 always determines the order of the two or more conditions and stores the values of the two or more conditions in the second data store 127 for future use when determining whether the correlation policy or conditions are satisfied, and/or for use when determining whether a different correlation policy or condition is satisfied.

In some embodiments, based on the policy type, the correlation engine 111 determines whether the first value is greater than a first preset value indicative of whether the first condition is satisfied, determines whether the second value is greater than a second preset value indicative of whether the second condition is satisfied, determines whether the correlation policy is satisfied based on the first value, the second value, and the policy type, and causes an operation to occur based on a determination that the correlation policy is satisfied. In some embodiments, the correlation engine 111 further determines an order of the first condition and the second condition among the two or more conditions, and determines whether the correlation policy is satisfied based on the first value, the second value, the order of the first condition and the second condition, and the policy type. In some embodiments, if the policy type is one that is independent of a specified order and/or is independent of time, the correlation engine 111 ignores the order of the conditions in the event data and/or processes the event data without consideration of time.

In some embodiments, the correlation engine 111 processes the event data for a predefined hold time until the correlation policy is satisfied or the predefined hold time is expired. In some embodiments, the correlation engine 111 causes the event data and the correlation policy to be discarded from a memory after the predefined hold time based on a determination that the correlation policy is not satisfied by the end of the predefined hold time. In some embodiments, the correlation engine 111 causes the event data to be discarded after the predefined hold time based on a determination that the correlation policy is satisfied by the end of the predefined hold time, and the correlation engine 111 detects the status of the network function 129 based on new event data and the correlation policy for a subsequent predefined hold time after the predefined hold time. In some embodiments, the predefined hold time is a validity time of the determined first value, and the correlation engine 111 is further caused to determine the first value is greater than the first preset value, process the event data to determine whether the second condition is satisfied during the hold time, and cause the first value to be discarded after the predefined hold time based on a determination that the second condition is not satisfied by the end of the predefined hold time.

In some embodiments, the correlation engine 111 causes the operation to occur after the end of the predefined hold time based on a determination that the correlation policy is satisfied during the predefined hold time.

In some embodiments, based on a determination that the policy type is a SC policy or a SNC policy, the correlation engine 111 processes the event data until the correlation policy is satisfied. The correlation engine 111 also causes at least a portion of the event data to be discarded based on a determination that the correlation policy cannot be satisfied during the predefined hold time, and/or adjusts the predefined hold time to facilitate processing the event data until the correlation policy is satisfied.

In some embodiments, based on a determination that the policy type is a SC policy or a SNC policy, the correlation engine 111 processes the event data until the correlation policy is satisfied. The correlation engine 111 also causes the event data to be discarded based on a determination that the correlation policy is satisfied, and detects the status of the network function 129 based on new event data and the correlation policy after the correlation policy is determined to be satisfied.

In some embodiments, the correlation policy comprises one or more unordered threshold-based conditions. The determination of whether the event data satisfies the one or more conditions defined by the correlation policy comprises a determination that the event data includes one or more values that meet or exceed a preset threshold value of at least one of the one or more unordered threshold-based conditions. In some embodiments, alternative comparisons to threshold values are included in the correlation policy. For example, although the sign ">" (which indicates "greater than") is used in the discussed examples for simplicity, one or more embodiments of the correlation policy optionally include other comparison signs like "<" (which indicates "less than"), ">=" (which indicates "greater or equal to"), or some other suitable operator.

As a non-limiting example, an unordered threshold-based condition may involve processing event data associated with determining whether a network node is up, down, or not ready. If, for example, the preset threshold values are NodeDown>=1 and NodeNotReady>=0, with a preset hold time of 10 minutes, once the preset threshold value is met or exceeded, there is no need to wait for the entire hold time, and correlation engine 111 causes the policy action manager 123 to trigger an operation to be performed by the lifecycle manager 119.

In some embodiments, the determination that the event data includes one or more values that meet or exceed a preset threshold value of the at least one of the one or more unordered threshold-based conditions is independent from time.

In some embodiments, the policy action manager 123 is configured to trigger the operation to be performed by the lifecycle manager 119 when the correlation engine 111 determines that the event data includes one or more values that meet or exceed the preset threshold value of the at least one of the one or more unordered threshold-based conditions, or an output is received from the correlation engine 111 indicating the same.

In some embodiments, the policy action manager 123 is configured to trigger the operation to be performed by the lifecycle manager 119 within a preset time interval from a moment the correlation engine 111 determines that the event data includes one or more values that meet or exceed the preset threshold value of the at least one of the one or more unordered threshold-based conditions, or an output is received from the correlation engine 111 indicating the same.

As a non-limiting example, an unordered time-based condition may involve processing event data associated with determining whether a particular process associated with a network function was a success or a failure. Such a policy, for example, may involve processes F1SctpFailure and F1SctpSuccess, where preset threshold values for the processes are F1SctpFailure>1 and F1SctpSuccess<1, a preset hold time is set for 10 minutes, and a rule that defines that the policy action manager 123 should wait for an entirety of the hold time before triggering the operation to be performed by the lifecycle manager 119 when the determined value for F1SctpFailure or F1SctpSuccess is less than or equal to 1.

The scheduler 115 is communicatively coupled with the correlation engine 111. The scheduler 115 is configured to set the preset time interval based on the determination that the event data includes one or more values that meet or exceed the preset threshold value of the at least one of the one or more unordered threshold-based conditions is made.

In some embodiments, the correlation policy comprises an instruction or data indicative of the preset time interval and the scheduler 115 is configured to cause the correlation engine 111 to communicate the preset time interval to the policy action manager 123 with the generated output. In some embodiments, the correlation engine 111 is configured to one or more of send or generate the one or more outputs based on the preset time interval communicated to the correlation engine 111 by the scheduler 115. In some embodiments, the correlation engine 111 is configured to process the enriched data based on a predefined schedule that is communicated to the correlation engine 111 one or more of by way of the scheduler 115 or the correlation policy. In some embodiments, the scheduler 115 is communicatively coupled with the lifecycle manager 119 and with the correlation engine 111, and the scheduler 115 is configured to set the predefined schedule based on feedback received from the lifecycle manager 119. In some embodiments, the scheduler 115 is configured to set the predefined schedule based on feedback received from the observability framework 101. In some embodiments, the scheduler 115 is directly communicatively coupled with the observability framework 101 and configured to set the predefined schedule based on feedback directly received from the observability framework 101. In some embodiments, the scheduler 115 is configured to set the predefined schedule based on information included in the enriched data sent to the correlation engine 111. In some embodiments, the scheduler 115 is configured to set the predefined schedule based on feedback received from the lifecycle manager 119 and the observability framework 101. In some embodiments, the system 100 excludes the scheduler 115 and the correlation engine 111 is configured to generate the one or more outputs independent of time or the correlation engine 111 is configured to generate the one or more outputs based on information included in the enriched data.

In some embodiments, the correlation policy comprises a first rule and a second rule, the event data comprises first event data, second event data and third event data. The correlation engine 111 is configured to determine that the event data satisfies the correlation policy based on a determination that the first event data includes a value greater than a first preset value and the second event data includes a value greater than a second preset value. The correlation engine 111 is also configured to determine that the event data satisfies the correlation policy based on a determination that the third event data includes a value greater than a third preset value. The policy action manager 123 is configured to trigger the lifecycle manager 119 to cause an operation corresponding to a third event corresponding to the third event data to occur based on the determination by the correlation engine 111 that the first event data includes the value greater than the first preset value and the second event data includes the value greater than the second preset value. The policy action manager 123 is additionally configured to trigger the lifecycle manager 119 to perform the operation based on the determination that the third event data is greater than a third preset value indicative that the operation has occurred.

In some embodiments, the correlation policy comprises one or more conditions associated with a preset order, the event data comprises two or more data points, and the determination of whether the event data satisfies the one or more conditions defined by the correlation policy comprises a determination that the two or more data points occur in the preset order.

As a non-limiting example, an ordered condition may involve processing event data associated with determining whether a pod failure has occurred followed by a determination that a failed pod has been restarted. If, for example, Event_Pod_Failure is determined to have occurred followed by Event_Pod_Restarted, the order of events matters according to the correlation policy, the condition is determined to be satisfied.

In some embodiments, the policy definition manager 121 is configured to generate at least one of the one or more rules, or the correlation policy, based on a user input received by way of the user interface 125. The user interface 125 is, for example, capable of being output by way of a display associated with any of a mobile terminal, a fixed terminal, a portable terminal including a desktop computer, laptop computer, notebook computer, netbook computer, tablet computer, wearable circuitry, mobile handset, server, or combination thereof.

In some embodiments, system 100 is configured to be communicatively coupled with, or included as a component of, a network manager or end-to-end orchestrator that controls one or more workflows associated with any network function 129 comprising or associated with one or more of a network element, a network service, a slice subnet, a slice manager, a cloud management as a service (CMAAS) manager, a bare metal unit, a bare metal as a service (BMAAS) manager, a service cluster, a policy life cycle manager, a hardware switch, a field programmable gate array, an eNodeB (eNB) in 4G, an NR base station (gNB) in 5G, a virtual distributed unit (vDU) and a virtual centralized unit (vCU), which are components of a radio access network (RAN) in 4G, a DU and a CU, which are components of the RAN in 5G, a virtual RAN (VRAN), a GC, an NFP, a logic cluster, a network node, a network device, an antenna, a communication layer, or other suitable network element. In some embodiments, the one or more workflows corresponds to a type of network element and comprises one or more of an operating system installation, an upgrade, a firmware upgrade, a change in BIOS settings, or some other suitable operation or event.

In some embodiments, the status of the network function is an operation state of a node in a communication network, and the operation comprises at least one of an alarm indicating the network node is inoperative and at least a portion of the communication network is down, or an instruction to heal the communication network by fixing or circumventing the network node that is inoperative.

In some embodiments, the correlation engine 111 determines the network is down or a network node is inoperable based on the event data and the lifecycle manager 119 is configured to output an instruction to heal the network such that the network function 129 is recognized by the observability framework 101 and the data received by the observability framework 101 is processed by the observability framework 101 and generates event data that is determined by the correlation engine 111 to satisfy the one or more conditions in the correlation policy. In some embodiments, based on one or more rules included in the correlation policy stored in the second datastore 127, the correlation engine 111 causes one or more event data values to be stored in the second datastore 127 for future use when determining if one or more unordered or ordered subsequent events occurs or does not occur in accordance with the conditions included in the correlation policy.

As a non-limiting example to aid in understanding the capabilities of system 100, an implementation of a correlation policy associated with restarting a pod is provided. In this example, the correlation policy includes rules directed to relocating a pod and restarting a network function. The rule directed to relocating a pod includes conditions for a quantity of times the pod has been restarted, a hold time, an action code to be implemented for relocating the pod, a topology root type such as "network function," filters such as a particular location or location range, and a defined action mode for determining an order of events or for implementing defined actions, for example, "sequence." The rule directed to restarting the network function includes conditions for a quantity of times the pod has been relocated, a hold time, an action code such as "restart network function," a topology root type such as "network function,"

filters such as a particular location or location range, and an action mode such as "topology."

If a kubernetes cluster associated with system 100, in this example, detects a failure of a container in a pod based on a probe signal sent to the pod by a kubernetes node in communication with the kubernetes cluster, the kubernetes node communicates the detected failure to the observability framework 101. The observability framework 101 then detects pod failures within a preset time interval. The kubernetes cluster causes the container in the pod to be restarted and determines whether the restart was successful. The kubernetes cluster then communicates the event data indicative of whether the pod container or the pod was restarted. The kubernetes node sends the probe signal to the pod to determine whether the container in the pod is active or in failure, and the kubernetes cluster reports to the observability framework 101 if the kubernetes cluster detects a subsequent failure of the container in the pod.

If the observability framework 101 detects that the quantity of pod container or pod restarts within the preset time interval exceeds a threshold value, then the lifecycle manager 119 causes the pod to be relocated to a different node by, for example, outputting a relocate pod instruction to be implemented by an end-to-end orchestrator in communication with the lifecycle manager 119 or within which the lifecycle manager 119 is included. The end-to-end orchestrator then outputs an instruction to the kubernetes cluster to restart the pod container or restart the pod, and the kubernetes cluster then restarts the pod container or restarts the pod on a different nod. In some embodiments, the correlation policy additionally includes a rule that causes the network function to be restarted based on a determination that relocating the pod container or the pod to a different node did not resolve the detected pod container or pod failure.

As another non-limiting example to aid in understanding the capabilities of system 100, an implementation of a correlation policy associated with failing to heal a failed pod is provided. In this example, the correlation policy includes rules directed to detecting whether a pod faulted multiple times and escalating a reported failure to an administrator. The rule directed to detecting whether a pod faulted multiple times includes conditions for a quantity of times the pod faulted, a hold time, an action code to be implemented for restarting a network function, a topology root type such as "network function," filters such as a particular location or location range, and a defined action mode such as "topology." The rule directed to escalating a reported failure to an administrator includes conditions for a quantity of times the pod has faulted, a hold time, an action code such as "notify administrator," a topology root type such as "network function," filters such as a particular location or location range, and an action mode such as "topology."

If a kubernetes cluster associated with system 100, in this example, detects a failure of a container in a pod based on a probe signal sent to the pod by a kubernetes node in communication with the kubernetes cluster, the kubernetes cluster attempts to restart the failed pod container or pod a preset quantity of times. In some embodiments, the kubernetes cluster attempts to restart the failed pod container or pod a preset quantity of times and if unsuccessful, attempts to relocate the failed pod container or pod. In some embodiments, the kubernetes cluster concurrently attempts to restart the failed pod container or pod and attempts to relocate the failed pod container or pod. In some embodiments, the preset quantity of attempts to restart the failed pod container or the failed pod includes the attempts to relocate the failed pod container or the failed pod. In some embodiments, the kubernetes cluster attempts to separately relocate the failed pod container or the failed pod for a preset correspond quantity of times associated with relocating the failed pod container or the failed pod. If the kubernetes is unsuccessful at restarting and/or relocating the failed pod container or the failed pod within the preset quantity of attempts, the kubernetes cluster communicates event data to the observability framework 101 indicating the failure to restart and/or relocate the failed pod container or the failed pod.

The lifecycle manager 119, based on processing of the event data received by the observability framework 101, recognizes that the pod container or pod that failed to restart has resulted in a network function that is missing the failed pod container or failed pod. The lifecycle manager 119 then terminates the network function and restarts the network function by outputting a restart network function instruction to be implemented by an end-to-end orchestrator in communication with the lifecycle manager 119 or within which the lifecycle manager 119 is included. The end-to-end orchestrator then outputs an instruction to the kubernetes cluster to restart the network function. If the kubernetes cluster is unable to restart the network function, or the kubernetes cluster again detects that the pod container or the pod failed a preset quantity of times within a predefined period after restarting the network function, the kubernetes cluster communicates event data to the observability framework 101 indicating that restarting the network function did not resolve the failed pod container or the failed pod, and the lifecycle manager 119 is caused to output an alert message to a system administrator as an alarm.

In some embodiments, the one or more rules included in a correlation policy involve one or more ordered and/or unordered sequences of events that are processed linearly or in parallel to determine the functionality of any defined network function included in a rule or combination of rules customized by a user by way of user interface 125. In some embodiments, one or more rules are processed independently or in conjunction with one another within a preset period of time.

EXAMPLES

The following non-limiting examples are provided to demonstrate NFAT evaluation wherein correlation engine 111 processes event data which, for simplicity, is discussed with respect to basic example variables "A" and "B" for exemplary correlation policies which, as discussed, may be customized for any particular purpose for identifying whether an operation is to be caused to occur or not. The event data in the following examples is merely exemplary for discussion purposes and can be any combination of variables, enriched or not enriched, associated with event data.

In the following examples, the event data includes an event stream that comprises events $A_1A_2B$. Correlation engine 111 processes the event data according to the correlation policies stored in second datastore 127.

Example 1

In this example, the correlation policy is SC (A>0, B>0).

The correlation engine 111 scans the event stream $A_1A_2B$ from the first event, $A_1$.

Since $A_1$ fulfills the order of "A first and B later" (i.e., the order defined by the SC policy), correlation engine 111 creates a first array, Array 1. In this example, since the SC policy defines two conditions, Array 1 will contain two columns, each of which associates with event A and event B, respectively. Generally, the initial state of the two columns are both in a NULL state when no associated events have been detected. In this case, since an event A is detected, the number of A in the first column of Array 1 will be increased to "1", and the first column of Array 1 will have a TRUE state (since A>0=TRUE).

| Array 1 | |
|---|---|
| A=1 | B=0 |
| A>0 = TRUE | B>0 = NULL |

Nevertheless, since the correlation engine 111 has not yet detected any event B, the number of B in the second column of Array 1 is "0" and the NULL state of second column of Array 1 is maintained (since B>0=NULL). Thus, although the condition "A>0" in the first column of Array 1 is matched with one of the conditions defined by the SC policy (i.e., A>0=TRUE, the conditions defined by the SC policy are partially matched), in view that a hold time has not yet passed and B>0=NULL, the current state of Array 1 is considered by the correlation engine 111 as a NULL state (which is a result of the TRUE state of the first column and the NULL state of the second column). Accordingly, the correlation engine 111 will not cause an operation to occur and will continue scanning/evaluating the subsequent event in the event stream.

If an event B is detected by the correlation engine 111 within a predefined hold time (if there is one), then the second column of Array 1 will have a TRUE state (since B>0=TRUE in that case), which will result in the state of Array 1 being the TRUE state. Accordingly, the correlation engine 111 will cause an operation to occur and will delete Array 1 thereafter. On the other hand, if no event B is detected after the hold time, the correlation engine 111 will consider the NULL state of Array 1 as a FALSE state, and thus consider the final state of Array 1 as a FALSE state. Accordingly, the correlation engine 111 will delete Array 1 without causing any operation to occur.

Example 2

This example is a continuation of Example 1, wherein the correlation policy is SC (A>0, B>0), and the processing of the event stream by the correlation engine 111 is within a predefined hold time. After completion of scanning of the first event of the event stream, correlation engine 111 will continue scanning the next event in the event steam. Thus, the correlation engine 111 scans the next event in the event stream $A_1A_2B$, $A_2$.

Since $A_2$ fulfills the order of "A first and B later" (i.e., the order defined by the SC policy), and since the SC policy requires all events to be adjacent to each other (i.e., to be included into the same column in Array 1), the number of A in the first column of Array 1 will be increased to "2".

| Array 1 | |
|---|---|
| A=2 | B=0 |
| A>0 = TRUE | B>0 = NULL |

The correlation engine 111 will scan the next event in the event stream $A_1A_2B$, B.

Since B fulfills the order of "A first and B later" (i.e., the order defined by the SC policy), and since the second column of Array 1 is waiting for an event B, the number of B in the second column of Array 1 will be increased to "1", and the second column of Array 1 will have a TRUE state (since B>0=TRUE).

| Array 1 | |
|---|---|
| A = 2 | B = 1 |
| A > 0 = TRUE | B > 0 = TRUE |

Since both first and second columns are now in a TRUE state (which will result in the state of Array 1 being the TRUE state), all conditions defined by the SC policy are matched, Array 1 fully matches the conditions of SC (A>0, B>0), and correlation engine 111 causes an operation to occur regardless of whether or not it is still within the hold time. Subsequently, the correlation engine 111 deletes Array 1.

Example 3

In this example, the correlation policy is SNC (A>0, B>0).

The correlation engine 111 scans the event stream $A_1A_2B$ from the first event, $A_1$.

Since $A_1$ fulfills the order of "A first and B later" (i.e., the order defined by the SNC policy), the correlation engine 111 creates a first array, Array 1. In this example, since the SNC policy defines two conditions, Array 1 will contain two columns, each of which associates with event A and event B, respectively. Since an event A is detected, the number of A in the first column of Array 1 will be increased to "1", and the first column of Array 1 will have a TRUE state (since A>0=TRUE).

| Array 1 | |
|---|---|
| A = 1 | B = 0 |
| A > 0 = TRUE | B > 0 = NULL |

Since the correlation engine 111 has not yet detected any event B, the number of B in the second column of Array 1 is "0" and the NULL state of second column of Array 1 is maintained (since B>0=NULL). Thus, although the condition "A>0" in the first column of Array 1 is matched with one of the conditions defined by the SNC policy (i.e., A>0=TRUE, the conditions defined by the SNC policy are partially matched), in view that a hold time has not yet passed and B>0=NULL, the correlation engine 111 considers the current state of Array 1 as a NULL state (which is a result of the TRUE state in the first column and the NULL state in the second column). Accordingly, the correlation engine 111 will not cause an operation to occur, and the correlation engine 111 will continue scanning/evaluating the event stream.

The correlation engine 111 then scans the next event in the event stream $A_1A_2B$, $A_2$.

Since $A_2$ fulfills the order of "A first and B later" (i.e., the order defined by the SNC policy), and since the SNC policy does not require all events to be adjacent to each other and the condition "A>0" in the first column of Array 1 is already matched (i.e., the conditions defined by the SNC policy are partially matched by Array 1), the correlation engine 111 creates a second array, Array 2. Similar to Array 1, since the SNC policy defines two conditions, Array 2 also contains two columns, each of which associates with event A and event B, respectively. Since an event A is detected, the number of A in the first column of Array 2 will be increased to "1", and the first column of Array 2 will have a TRUE state (since A>0=TRUE).

| Array 1 | |
| --- | --- |
| A = 1 | B = 0 |
| A > 0 = TRUE | B > 0 = NULL |

| Array 2 | |
| --- | --- |
| A = 1 | B = 0 |
| A > 0 = TRUE | B > 0 = NULL |

Since the correlation engine 111 has not yet detected any event B, the number of B in the second column of Array 1 and Array 2 is "0" and the NULL state of second column of Array 1 and Array 2 is maintained (since B>0=NULL). Thus, although the condition "A>0" in column 1 of Array 1 and Array 2 is matched with one of the conditions defined by the SNC policy (i.e., A>0=TRUE, the conditions defined by the SNC policy are partially matched), in view that the hold time has not yet passed and B>0=NULL in both Array 1 and Array 2, the current state of Array 1 and Array 2 is considered by the correlation engine 111 as a NULL state (which is a result of the TRUE state and the NULL state). Accordingly, the correlation engine 111 will not cause an operation to occur and will continue scanning/evaluating the event stream.

The correlation engine 111 will then scan the next event in the event stream $A_1A_2B$, B.

Since B fulfills the order of "A first and B later" (i.e., the order defined by the SNC policy), and since the second column of Array 1 is waiting for an event B and Array 1 is created before Array 2, the number of B in the second column of Array 1 will be increased to "1", and the second column of Array 1 will have a TRUE state (since B>0=TRUE). The state of Array 2 remains unchanged.

| Array 1 | |
| --- | --- |
| A = 1 | B = 1 |
| A > 0 = TRUE | B > 0 = TRUE |

| Array 2 | |
| --- | --- |
| A = 1 | B = 0 |
| A > 0 = TRUE | B > 0 = NULL |

Since both of the first and second columns in Array 1 are in a TRUE state (which will result in the state of Array 1 being the TRUE state), all conditions defined by the SC policy is matched, Array 1 fully matches the conditions of SNC (A>0, B>0), the correlation engine 111 causes to occur regardless of whether or not it is still within the hold time. Subsequently, the correlation engine deletes Array 1, and only Array 2 remains.

| Array 2 | |
| --- | --- |
| A = 1 | B = 0 |
| A > 0 = TRUE | B > 0 = NULL |

Since the conditions of Array 2 only partially match the conditions defined by the SNC policy, the correlation engine 111 will maintain Array 2 for the hold time and will wait for the next event.

If an event B is detected by the correlation engine 111 within the hold time, then the second column of Array 2 will have a TRUE state (since B>0=TRUE in that case), which will result in the state of Array 2 being the TRUE state. Accordingly, the correlation engine 111 causes an operation to occur and deletes Array 2 thereafter. On the other hand, if no event B is detected after the hold time, the correlation engine 111 considers the NULL state of Array 2 as a FALSE state, and thus considers the final state of Array 2 as a FALSE state. Accordingly, the correlation engine 111 deletes Array 2 without causing an operation to occur.

Example 4

In this example, the correlation policy is RC (A>0, B>0).

The correlation engine 111 scans the event stream $A_1A_2B$ from the first event, $A_1$.

Since the conditions are defined by RC policy, and the first event $A_1$ is associated with one of the conditions (i.e., A>0), the correlation engine 111 creates a tree structure, Tree 1. In this example, since the RC policy defines two conditions (i.e., A>0 and B>0), two leaves will be created for Tree 1.

Generally, the state of the two leaves are both in a NULL state when no associated events have been detected. In this case, since an event A is detected, the number of A in Leaf 1 is increased into "1", and the Leaf 1 will have a TRUE state (since A>0=TRUE).

| Tree 1 | |
| --- | --- |
| Leaf 1 | Leaf 2 |
| A = 1 | B = 0 |
| A > 0 = TRUE | B > 0 = NULL |

Generally, before passing a hold time, the final state of Tree 1 has not yet been evaluated by the correlation engine 111, and thus the state of Tree 1 can be either one of the states of TRUE, FALSE, or NULL. After the hold time, the correlation engine 111 evaluates the final state of Tree 1, and the final state will only be one of the TRUE state or the FALSE state.

In this example, the correlation engine 111 has not yet detected any event B, and thus the number of B in Leaf 2 is "0" and the condition of "B>0" in Leaf 2 is having a NULL state. Although the condition "A>0" in Leaf 1 is matched with one of the conditions defined by the RC policy (i.e., A>0=TRUE, the conditions defined by the RC policy are partially matched), in view that the hold time has not yet passed and B>0=NULL in Leaf 2, the current state of Tree 1 will be considered by the correlation engine 111 as a NULL state (which is a result of the TRUE state in Leaf 1 and the NULL state in Leaf 2). Accordingly, the correlation engine 111 will not cause an operation to occur and will continue scanning/evaluating the event stream.

Subsequently, if an event B is detected by the correlation engine 111 within the hold time, then the state of Leaf 2 will become a TRUE state (since B>0=TRUE), which will result in the state of Tree 1 being the TRUE state. Accordingly, the correlation engine 111 will cause an operation to occur and will delete Tree 1 thereafter. On the other hand, if no event B is detected after the hold time, the correlation engine 111 considers the NULL state of Tree 1 as a FALSE state, and thus considers the final state of Tree 1 as a FALSE state. Accordingly, the correlation engine 111 deletes Tree 1 without causing an operation to occur.

Example 5

This example is a continuation of Example 4, wherein the correlation policy is RC (A>0, B>0), and the processing of the event stream by the correlation engine 111 is within the hold time. After completion of scanning of the first event of the event stream, correlation engine 111 will continue scanning the next event in the event steam. Thus, the correlation engine 111 scans the next event in the event stream $A_1A_2B$, $A_2$.

Since RC policy requires that all events to be adjacent to each other (i.e., in the same leaf of the same tree structure), the number of A in Leaf 1 will be increased to "2".

| Tree 1 | |
|---|---|
| Leaf 1 | Leaf 2 |
| A = 2 | B = 0 |
| A > 0 = TRUE | B > 0 = NULL |

The correlation engine 111 then scans the next event in the event stream $A_1A_2B$, B.

Since Leaf 2 is waiting for event B, the number of B in Leaf 2 will be increased to "1", and Leaf 2 will have a TRUE state (since B>0=TRUE).

| Tree 1 | |
|---|---|
| Leaf 1 | Leaf 2 |
| A = 2 | B = 1 |
| A > 0 = TRUE | B > 0 = TRUE |

Since both of Leaf 1 and Leaf 2 are in the TRUE state (which will result in the state of Tree 1 being the TRUE state), all conditions defined by the RC policy is matched, the state/conditions of Tree 1 fully match the conditions of SC (A>0, B>0), and the correlation engine 111 causes an operation to occur. Subsequently, the correlation engine 111 deletes Tree 1.

Example 6

In this example, the correlation policy is RNC (A>0, B>0).

Correlation engine 111 scans the event stream $A_1A_2B$ from the first event, $A_1$.

Since the conditions are defined by RNC policy, and the first event $A_1$ is associated with one of the conditions (i.e., A>0), the correlation engine 111 creates a first tree structure, Tree 1. In this example, since the RC policy defines two conditions (i.e., A>0 and B>0), the correlation engine 111 creates two leaves for the first tree.

The number of A in Leaf 1 of Tree 1 is increased into "1", and Leaf 1 of Tree 1 will have a TRUE state (since A>0=TRUE).

| Tree 1 | |
|---|---|
| Leaf 1 | Leaf 2 |
| A = 1 | B = 0 |
| A > 0 = TRUE | B > 0 = NULL |

Since the correlation engine has not yet detected any event B, the number of B in Leaf 2 is "0" and the condition of "B>0" is having a NULL state. Thus, although the condition "A>0" in Leaf 1 is matched with one of the conditions defined by the RNC policy (i.e., A>0=TRUE, the conditions defined by the RNC policy are partially matched), and in view that the hold time has not yet passed and B>0=NULL in Leaf 2 of Tree 1, the correlation engine 111 considers the current state of Tree 1 as a NULL state (which is a result of the TRUE state and the NULL state). Accordingly, the correlation engine 111 will not cause an operation to occur and will continue scanning/evaluating the event stream.

The correlation engine 111 then scans the next event in the event stream $A_1A_2B$, $A_2$.

Since the RNC policy does not require all events to be adjacent to each other (i.e., in the same Leaf of the same Tree structure), and since $A_2$ is associated with one of the conditions (i.e., A>0) defined by the RNC policy and the condition "A>0" in Leaf 1 of Tree 1 is already matched (i.e., the conditions defined by the RNC policy are partially matched by Tree 1), the correlation engine 111 creates a second tree structure, Tree 2. In this example, since the RC policy defines two conditions (i.e., A>0 and B>0), the correlation engine 111 creates two leaves for the second tree, Tree 2.

The number of A in Leaf 1 of Tree 2 is increased into "1", and Leaf 1 of Tree 2 will have a TRUE state (since A>0=TRUE).

| Tree 1 | |
|---|---|
| Leaf 1 | Leaf 2 |
| A = 1 | B = 0 |
| A > 0 = TRUE | B > 0 = NULL |

| Tree 2 | |
|---|---|
| Leaf 1 | Leaf 2 |
| A = 1 | B = 0 |
| A > 0 = TRUE | B > 0 = NULL |

Since the correlation engine 111 has not yet detected any event B, the number of B in Leaf 2 of Tree 1 and Tree 2 is "0" and the condition of "B>0" in Leaf 2 of Tree 1 and Tree 2 is having a NULL state. Thus, although the condition "A>0" in Leaf 1 of Tree 1 and Leaf 1 of Tree 2 is matched with one of the conditions defined by the RNC policy (i.e., A>0=TRUE, the conditions defined by the RC policy are partially matched), and in view that the hold time has not yet passed and B>0=NULL in Leaf 2 of Tree 1 and Leaf 2 of Tree 2, the correlation engine 111 considers the current state of Tree 1 and Tree 2 as a NULL state (which is a result of the TRUE state and the NULL state). Accordingly, the correlation engine 111 will not cause an operation to occur and will continue scanning/evaluating the event stream.

The correlation engine 111 then scans the next event in the event stream $A_1A_2B$, B.

Since Leaf 2 of Tree 1 is waiting for an event B and since Tree 1 is created earlier than Tree 2, the number of B in Leaf 2 of Tree 1 will increase to "1", and Leaf 2 of Tree 1 will have a TRUE state (since B>0=TRUE). The status of Tree 2 will remain unchanged.

| Tree 1 | |
| --- | --- |
| Leaf 1 | Leaf 2 |
| A = 1 | B = 1 |
| A > 0 = TRUE | B > 0 = TRUE |

| Tree 2 | |
| --- | --- |
| Leaf 1 | Leaf 2 |
| A = 1 | B = 0 |
| A > 0 = TRUE | B > 0 = NULL |

Since both of Leaf 1 and Leaf 2 of Tree 1 is in the TRUE state (which will result in Tree 1 being in the TRUE state), all conditions defined by the RNC policy are matched, and conditions of Tree 1 fully match the conditions of RNC (A>0, B>0), the correlation engine 111 causes an operation to occur. Subsequently, the correlation engine 111 deletes Tree 1.

Since the conditions of Tree 2 only partially match the conditions defined by the RNC policy, the correlation engine 111 will maintain Tree 2 for the hold time and wait for the next event.

If an event B is detected by the correlation engine 111 within the hold time, then Leaf 2 of Tree 2 will have a TRUE state (since B>0=TRUE in that case), which will result in the state of Tree 2 being the TRUE state. Accordingly, the correlation engine 111 causes an operation to occur and deletes Tree 2 thereafter. On the other hand, if no event B is detected after the hold time, the correlation engine will consider the NULL state of Tree 2 as a FALSE state, and thus consider the final state of Tree 2 as a FALSE state. Accordingly, the correlation engine deletes Tree 2 without causing an operation to occur.

Figure 2:
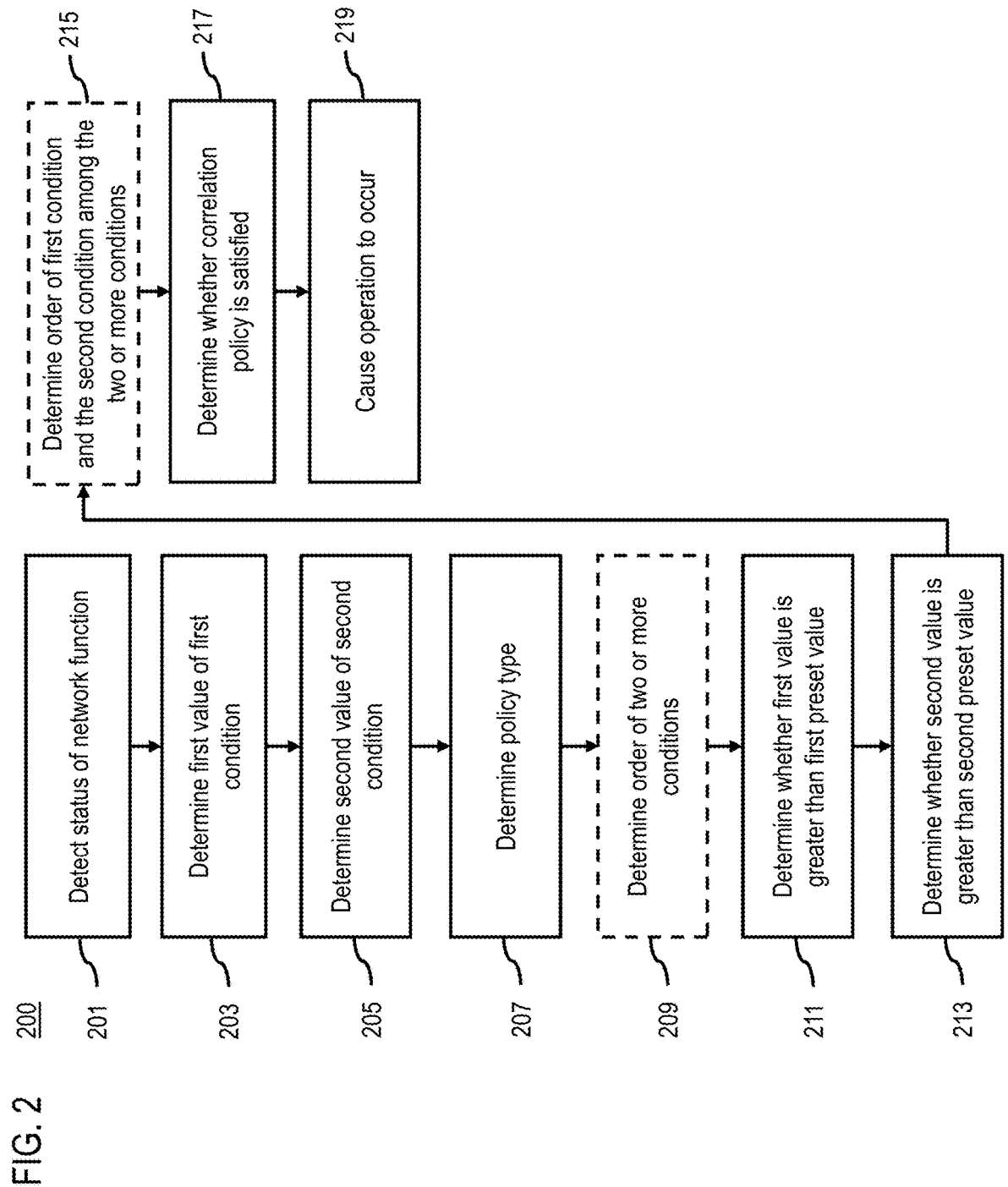
FIG. 2 is a flowchart of a process for managing and/or applying an NFAT structure correlation policy, in accordance with some embodiments.
Figure 11:
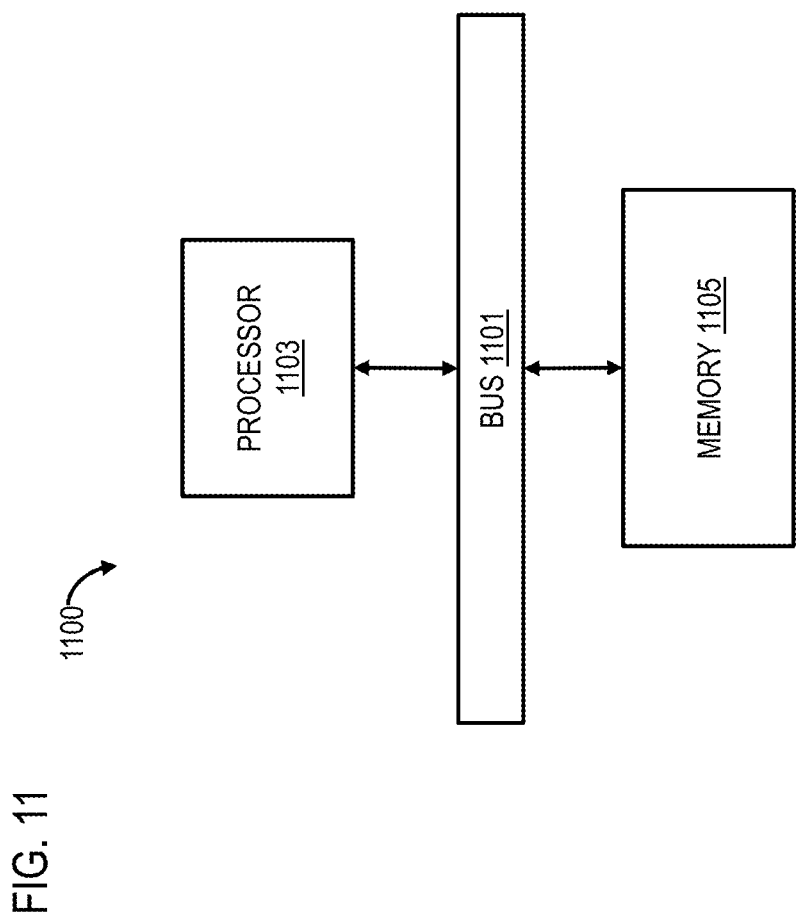
FIG. 11 is a functional block diagram of a computer or processor-based system upon which or by which some embodiments are implemented.

FIG. 2 is a flowchart of a process 200 for managing and/or applying an NFAT structure correlation policy, in accordance with one or more embodiments. In some embodiments, the system 100 (FIG. 1) performs the process 200 and is implemented in or by, for instance, a chip set including a processor and a memory as shown in FIG. 11.

In step 201, event data received from an observability framework is processed to detect a status of a network function. The event data is processed based on two or more conditions defined by a NFAT structure correlation policy having a policy type comprising a strict contiguous (SC) policy, a strict non-contiguous (SNC) policy, a relaxed contiguous (RC) policy, a relaxed non-contiguous (RNC) policy, or a combination thereof. The characteristics of each of the SC policy, the SNC policy, the RC policy, and the RNC policy have been described in the above and thus similar descriptions will be omitted herein for simplicity.

In step 203, a first value of a first condition of the two or more conditions is determined.

In step 205, a second value of a second condition of the two or more conditions is determined.

In step 207, the policy type of the correlation policy is determined.

In optional step 209, an order of the two or more conditions is determined based on the policy type.

In step 211, a determination is made as to whether the first value is greater than a first preset value indicative of whether the first condition is satisfied.

In step 213, a determination is made as to whether the second value is greater than a second preset value indicative of whether the second condition is satisfied.

In optional step 215, a determination based on the policy type is made regarding an order of the first condition and the second condition among the two or more conditions.

In step 217, a determination is made as to whether the correlation policy is satisfied based on the first value, the second value, and the policy type. In some embodiments which optional steps 209 and 215 are included, step 217 comprises a determination as to whether the correlation policy is satisfied based on the first value, the second value, the order of the first condition and the second condition, and the policy type. In some embodiments, the event data is processed for a predefined hold time until the correlation policy is satisfied or the predefined hold time is expired. In some embodiments, the event data and the correlation policy is caused to be discarded after the predefined hold time based on a determination that the correlation policy is not satisfied by the end of the predefined hold time. In some embodiments, the event data to is caused to be discarded after the predefined hold time based on a determination that the correlation policy is satisfied by the end of the predefined hold time, and the process returns to step 201 to determine status of the network function based on new event data and the correlation policy for a subsequent predefined hold time after the predefined hold time. In some embodiments, the predefined hold time is a validity time of the determined first value, and if the first value is greater than the first preset value, the event data is further processed to determine whether the second condition is satisfied during the hold time. Then, the first value is caused to be discarded after the predefined hold time based on a determination that the second condition is not satisfied by the end of the predefined hold time.

In some embodiments, based on a determination that the policy type is a SC policy or a SNC policy, the event data is processed until the correlation policy is satisfied. Then, at least a portion of the event data is caused to be discarded based on a determination that the correlation policy cannot be satisfied during the predefined hold time, and/or the predefined hold time is adjusted to facilitate processing the event data until the correlation policy is satisfied.

In some embodiments, based on a determination that the policy type is the SC policy or the SNC policy, the event data is processed until the correlation policy is satisfied. Then, the event data is discarded based on a determination that the correlation policy is satisfied, and the status of the network function is determined based on new event data and the correlation policy after the correlation policy is determined to be satisfied.

In step 219, an operation is caused to occur based on a determination that the correlation policy is satisfied in step 217. In some embodiments, the operation is caused to occur after the end of the predefined hold time based on a determination that the correlation policy is satisfied during the predefined hold time. In some embodiments, the status of the network function is an operation state of a node in a communication network, and the operation comprises an alarm indicating the network node is inoperative and at least a portion of the communication network is down. In some embodiments, the operation further comprises healing the communication network by fixing or circumventing the network node that is inoperative.

Figure 3:
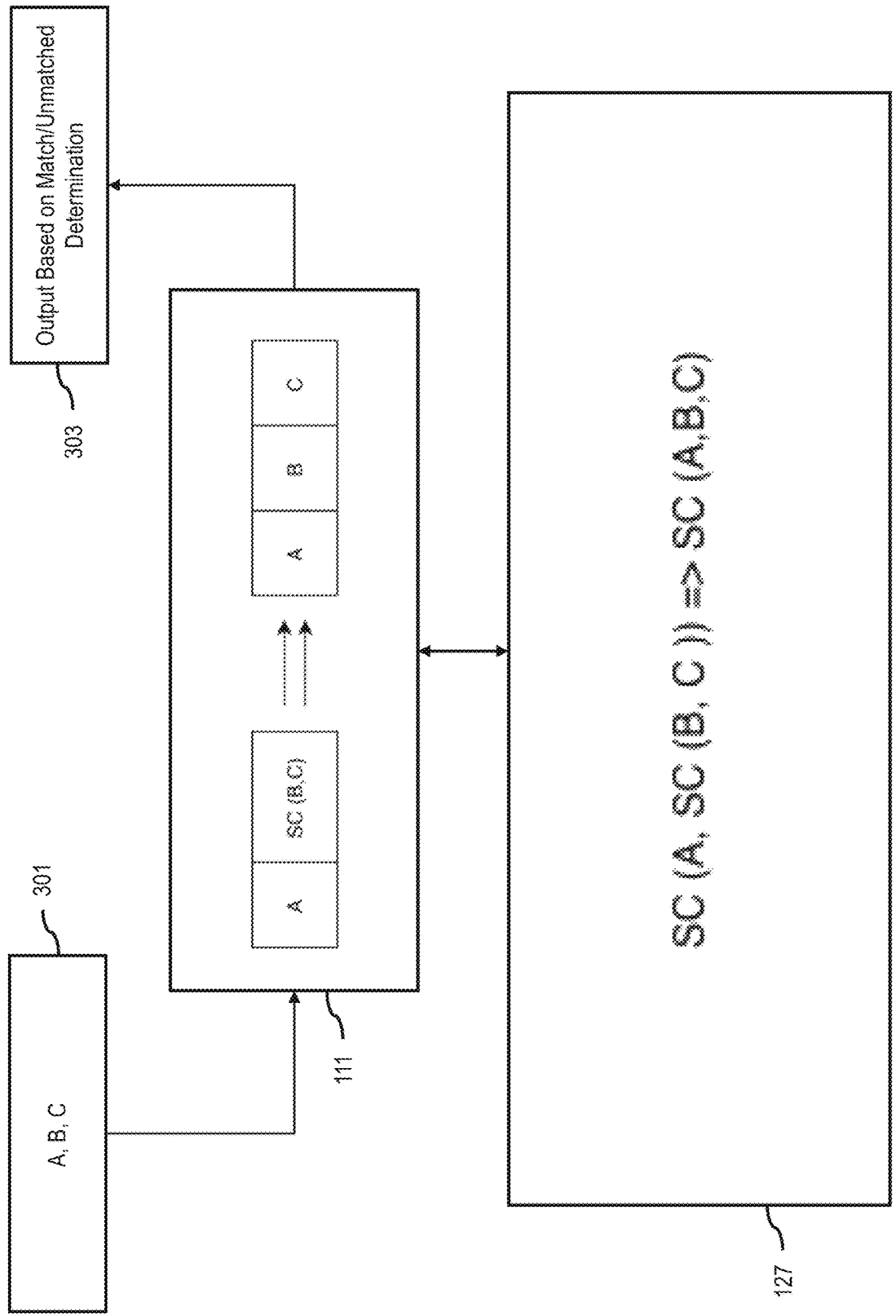
FIG. 3 is a block diagram of an NFAT evaluation, in accordance with some embodiments.

FIG. 3 is a block diagram of an NFAT evaluation 300, in accordance with one or more embodiments.

In NFAT evaluation 300, correlation engine 111 processes event data 301 communicated to correlation engine 111 as discussed with respect to system 100 (FIG. 1). NFAT evaluation 300 is an example demonstrating how correlation engine 111 evaluates received event data 301 which, for simplicity, is discussed with respect to basic example variables "A," "B", "C". Event data 301 is merely exemplary for discussion purposes and can be any combination of variables, enriched or not enriched, associated with specific event data received by observability framework 101 (FIG. 1).

In NFAT evaluation 300, event data 301 includes an event stream comprising events A, B, C. Correlation engine 111 processes the event data according to a strict contiguous of strict contiguous correlation policy SC (A, SC (B, C)), which is equivalent to a strict contiguous policy SC (A, B, C). Said policies are stored in second datastore 127. Effectively, based on the correlation policy in this example, correlation engine 111 is processing the event data 301 to see if an event A arrives before a combination of an event B and an event C, wherein the event B occurs before the event C. The details of the NFAT evaluation (such as the specific conditions defined by the policy, the creation of array, etc.) are omitted for simplicity, and further details will be included in the following examples.

Based on the event stream being an event stream comprising events A, B, C, correlation engine 111 determines the strict contiguous correlation policy is satisfied, generates an output 303 that indicates the correlation policy is satisfied, and deletes the event data 301.

Figure 4:
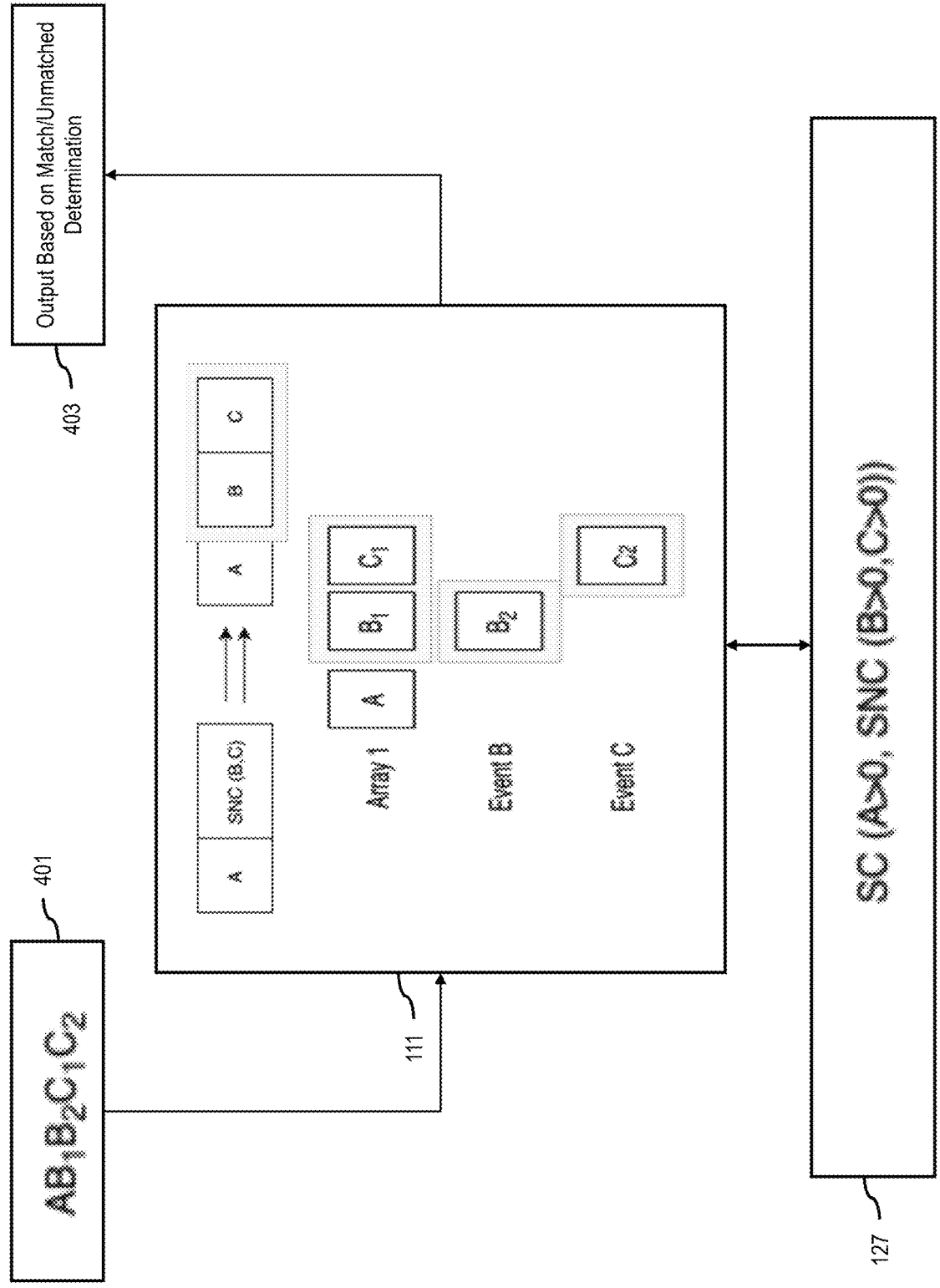
FIG. 4 is a block diagram of an NFAT evaluation, in accordance with some embodiments.

FIG. 4 is a block diagram of an NFAT evaluation 400, in accordance with one or more embodiments.

In NFAT evaluation 400, correlation engine 111 processes event data 401 communicated to correlation engine 111 as discussed with respect to system 100 (FIG. 1). NFAT evaluation 400 is an example demonstrating how correlation engine 111 evaluates received event data 401 which, for simplicity, is discussed with respect to basic example variables "A," "B", "C". Event data 401 is merely exemplary for discussion purposes and can be any combination of variables, enriched or not enriched, associated with specific event data received by observability framework 101 (FIG. 1).

In NFAT evaluation 400, event data 401 includes an event stream comprising events A, $B_1$, $B_2$, $C_1$, $C_2$. Correlation engine 111 processes the event data according to a strict contiguous of a strict non-contiguous correlation policy, SC (A>0, SNC (B>0, C>0)), that is stored in second datastore 127. Effectively, based on the correlation policy in this example, correlation engine is processing the event data 401 to see if an event A arrives before a combination of event B and event C, and to see whether one event B or multiple events B occurs before or after one event C or multiple events C.

Based on the event stream being A, $B_1$, $B_2$, $C_1$, $C_2$, correlation engine 111 determines A, $B_1$, $C_1$ forms an array that matches the pattern A, B, C defined by the strict contiguous of the strict non-contiguous correlation policy, determines that the strict contiguous of the strict non-contiguous correlation policy is satisfied, generates an output 403 that indicates the correlation policy is satisfied, and deletes the array comprising events A, $B_1$, $C_1$.

Given that the correlation policy in this example is a strict contiguous of a strict non-contiguous correlation policy, with event A already being used in the formed array and deleted, the correlation engine 111 determines that events $B_2$, $C_2$ cannot possibly satisfy the correlation policy, because there is no additional event A before $B_2$ and $C_2$. Correlation engine 111, accordingly, deletes events $B_2$, $C_2$.

Figure 5:
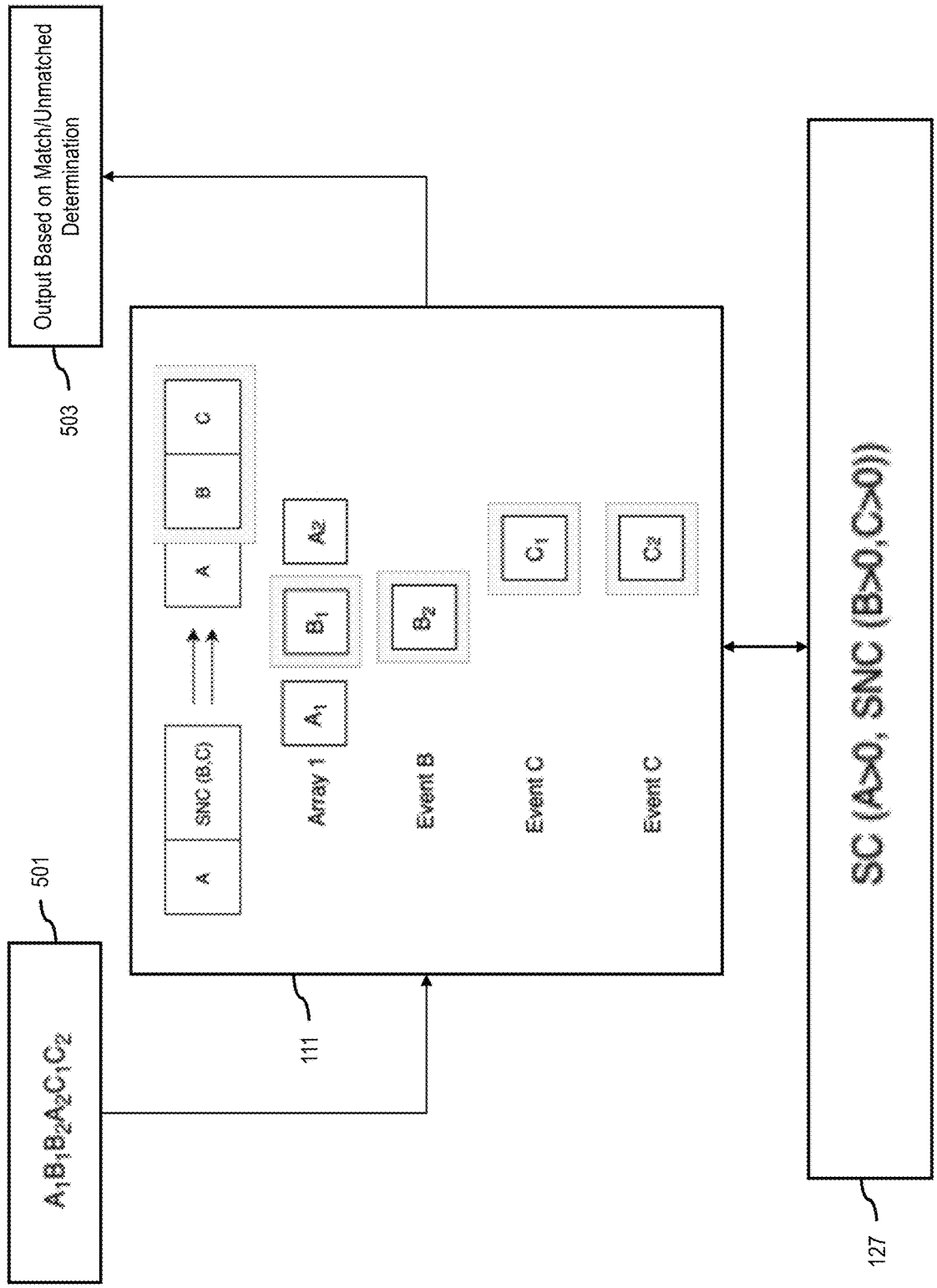
FIG. 5 is a block diagram of an NFAT evaluation, in accordance with some embodiments.

FIG. 5 is a block diagram of an NFAT evaluation 500, in accordance with one or more embodiments.

In NFAT evaluation 500, correlation engine 111 processes event data 501 communicated to correlation engine 111 as discussed with respect to system 100 (FIG. 1). NFAT evaluation 500 is an example demonstrating how correlation engine 111 evaluates received event data 501 which, for simplicity, is discussed with respect to basic example variables "A," "B", "C". Event data 501 is merely exemplary for discussion purposes and can be any combination of variables, enriched or not enriched, associated with specific event data received by observability framework 101 (FIG. 1).

In NFAT evaluation 500, event data 501 includes an event stream comprising events $A_1$, $B_1$, $B_2$, $A_2$, $C_1$, $C_2$. Correlation engine 111 processes the event data according to a strict contiguous of a strict non-contiguous correlation policy, SC (A>0, SNC (B>0, C>0)), that is stored in second datastore 127. Effectively, based on the correlation policy in this example, correlation engine is processing the event data 501 to see if an event A arrives before a combination of event B and event C, and to see whether one event B or multiple events B occurs before or after one event C or multiple events C.

Based on the event stream being $A_1$, $B_1$, $B_2$, $A_2$, $C_1$, $C_2$, correlation engine 111 determines no array that matches the pattern A, B, C defined by the strict contiguous of the strict non-contiguous correlation policy can be formed and determines that the strict contiguous of the strict non-contiguous correlation policy is not satisfied, generates an output 503 that indicates the correlation policy is not satisfied, and deletes an array comprising events $A_1$, $B_1$, $A_2$, because $A_2$ does not arrives before a combination of event B and event C but instead occurs between an event B and an event C.

Given that the correlation policy in this example is a strict contiguous of a strict non-contiguous correlation policy, with events $A_1$ and $A_2$ already being deleted, the correlation engine 111 determines that events $B_2$, $C_1$, and $C_2$ cannot possibly satisfy the correlation policy, because there is no additional event A before event $B_2$, no events A, B before event $C_1$, and no events A, B before event $C_2$. Correlation engine 111, accordingly, deletes events $B_2$, $C_1$, $C_2$.

Figure 6:
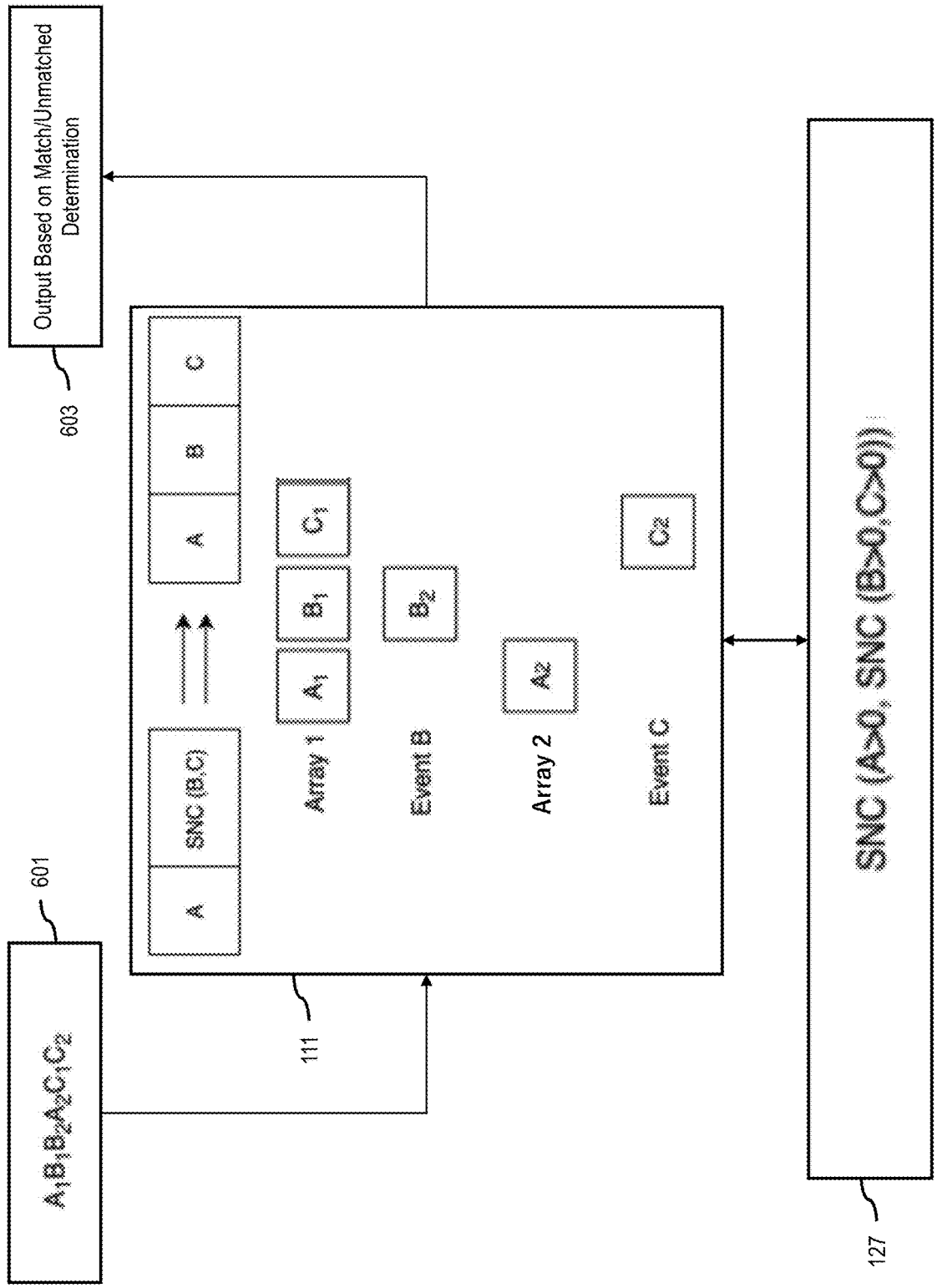
FIG. 6 is a block diagram of an NFAT evaluation, in accordance with some embodiments.

FIG. 6 is a block diagram of an NFAT evaluation 600, in accordance with one or more embodiments. In this embodiment, an event stream similar to the one in FIG. 5 is processed based on a type of correlation policy different from the one in FIG. 5.

In NFAT evaluation 600, correlation engine 111 processes event data 601 communicated to correlation engine 111 as discussed with respect to system 100 (FIG. 1). NFAT evaluation 600 is an example demonstrating how correlation engine 111 evaluates received event data 601 which, for simplicity, is discussed with respect to basic example variables "A," "B", "C". Event data 601 is merely exemplary for discussion purposes and can be any combination of variables, enriched or not enriched, associated with specific event data received by observability framework 101 (FIG. 1).

In NFAT evaluation 600, event data 601 includes an event stream comprising events $A_1$, $B_1$, $B_2$, $A_2$, $C_1$, $C_2$. Correlation engine 111 processes the event data according to a strict non-contiguous of a strict non-contiguous correlation policy, SNC (A>0, SNC (B>0, C>0)), that is stored in second datastore 127. Effectively, based on the correlation policy in this example, correlation engine is processing the event data 601 to see whether one event A or multiple events A arrives before or after a combination of event B and event C, and to see whether one event B or multiple events B occurs before or after one event C or multiple events C.

Based on the event stream being $A_1$, $B_1$, $B_2$, $A_2$, $C_1$, $C_2$, correlation engine 111 determines that an array formed by events $A_1$, $B_1$, $C_1$ matches the pattern A, B, C defined by the strict non-contiguous of the strict non-contiguous correlation policy and determines that the correlation policy is satisfied, generates an output 603 that indicates the correlation policy is satisfied, and deletes the array comprising values $A_1$, $B_1$, $C_1$.

Given that the correlation policy in this example is a strict non-contiguous of a strict non-contiguous correlation policy, with values $A_1$, $B_1$, $C_1$ already being deleted, the correlation engine 111 determines that events $B_2$, $A_2$, and $C_2$ cannot possibly satisfy the correlation policy, because event $A_2$ does not arrive before the combination of event $B_2$ and event $C_2$, rather event $A_2$ is between event $B_2$ and event $C_2$. Correlation engine 111, accordingly, deletes events $B_2$, $A_2$, and $C_2$.

Figure 7:
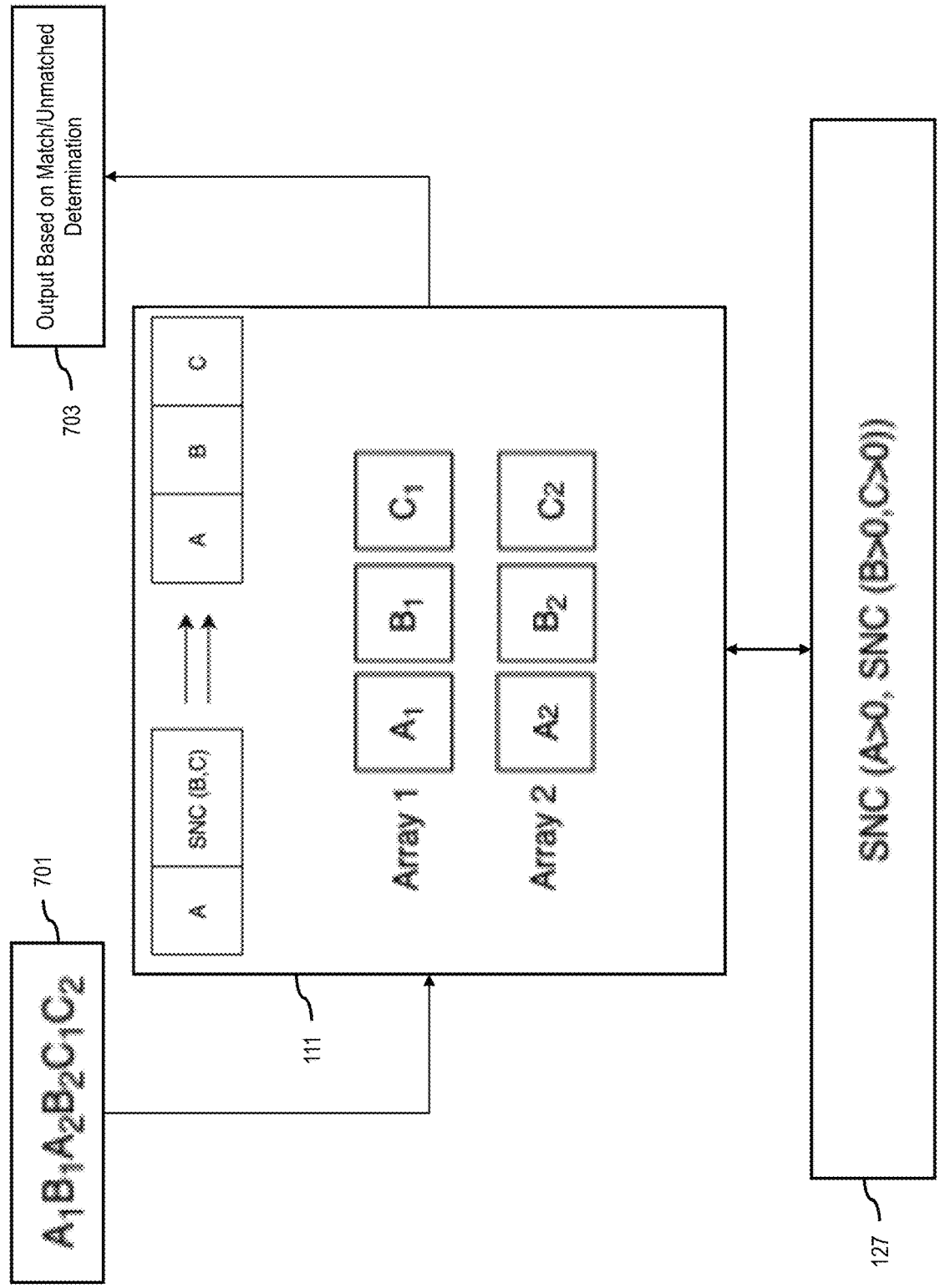
FIG. 7 is a block diagram of an NFAT evaluation, in accordance with some embodiments.

FIG. 7 is a block diagram of an NFAT evaluation 700, in accordance with one or more embodiments. In this embodiment, an event stream different from the one in FIG. 6 is processed based on a type of correlation policy similar to the one in FIG. 6.

In NFAT evaluation 700, correlation engine 111 processes event data 701 communicated to correlation engine 111 as discussed with respect to system 100 (FIG. 1). NFAT evaluation 700 is an example demonstrating how correlation engine 111 evaluates received event data 701 which, for simplicity, is discussed with respect to basic example variables "A," "B", "C". Event data 701 is merely exemplary for discussion purposes and can be any combination of variables, enriched or not enriched, associated with specific event data received by observability framework 101 (FIG. 1).

In NFAT evaluation 700, event data 701 includes an event stream comprising events $A_1$, $B_1$, $A_2$, $B_2$, $C_1$, $C_2$. Correlation engine 111 processes the event data according to a strict non-contiguous of a strict non-contiguous correlation policy, SNC (A>0, SNC (B>0, C>0)), that is stored in second datastore 127. Effectively, based on the correlation policy in this example, correlation engine 111 is processing the event data 701 to see whether one event A or multiple events A arrives before or after a combination of event B and event C, and to see whether one event B or multiple events B occurs before or after one event C or multiple events C.

Based on the event stream being $A_1$, $B_1$, $A_2$, $B_2$, $C_1$, $C_2$, correlation engine 111 determines that a first array formed by events $A_1$, $B_1$, $C_1$ matches the pattern A, B, C defined by the strict non-contiguous of the strict non-contiguous correlation policy and determines the correlation policy is satisfied, generates an output 703 that indicates the correlation policy is satisfied, and deletes the array comprising $A_1$, $B_1$, $C_1$. Correlation engine 111 also determines that a second array formed by events $A_2$, $B_2$, $C_2$ matches the pattern A, B, C defined by the strict non-contiguous of the strict non-contiguous correlation policy and determines the correlation policy is again satisfied, generates an output 703 that indicates the correlation policy is satisfied, and deletes the array comprising $A_2$, $B_2$, $C_2$.

Figure 8:
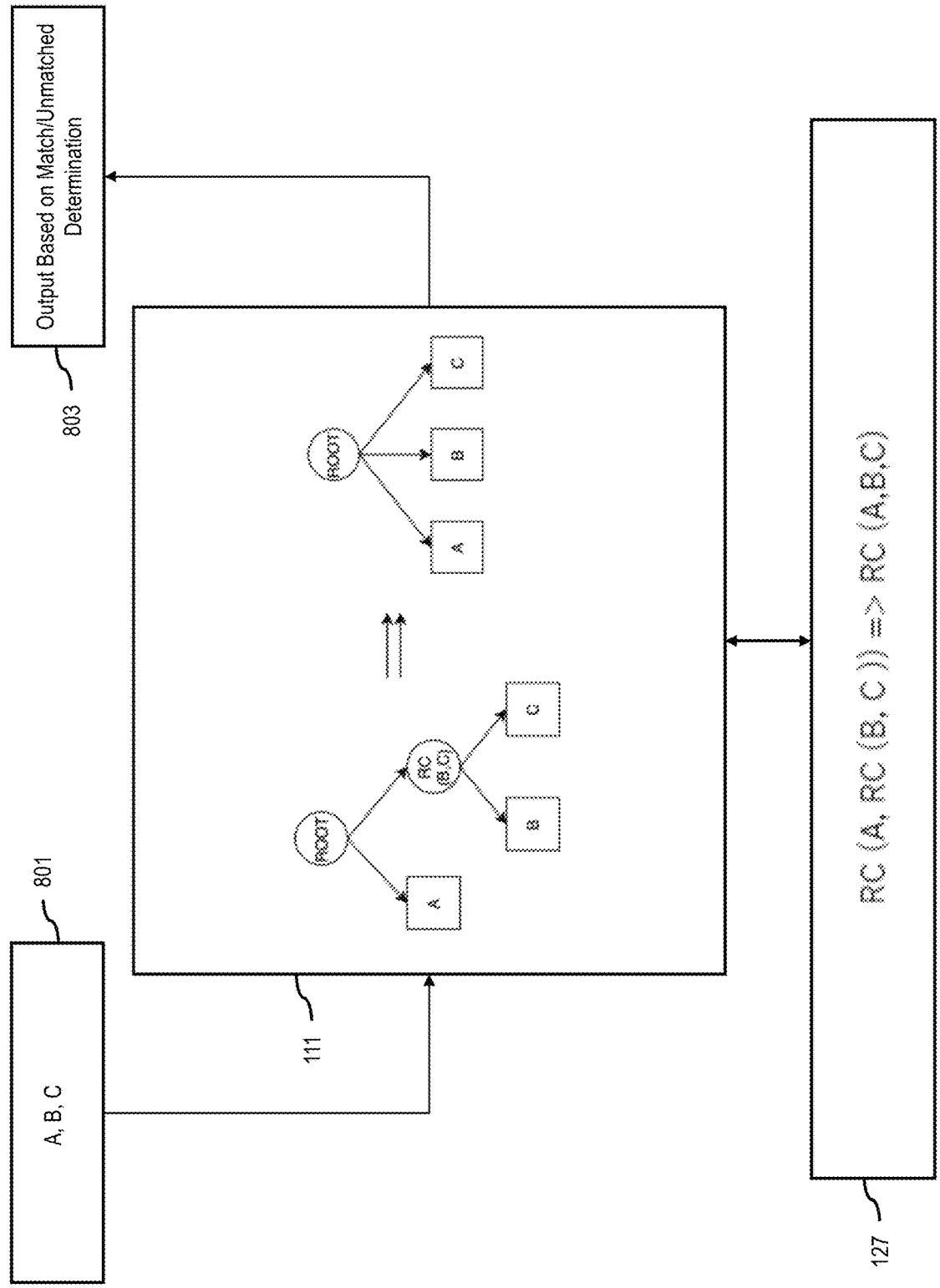
FIG. 8 is a block diagram of an NFAT evaluation, in accordance with some embodiments.

FIG. 8 is a block diagram of an NFAT evaluation 800, in accordance with one or more embodiments.

In NFAT evaluation 800, correlation engine 111 processes event data 801 communicated to correlation engine 111 as discussed with respect to system 100 (FIG. 1). NFAT evaluation 800 is an example demonstrating how correlation engine 111 evaluates received event data 801 which, for simplicity, is discussed with respect to basic example variables "A," "B", "C". Event data 801 is merely exemplary for discussion purposes and can be any combination of variables, enriched or not enriched, associated with specific event data received by observability framework 101 (FIG. 1).

In NFAT evaluation 800, event data 801 includes an event stream comprising events A, B, C. Correlation engine 111 processes the event data according to a relaxed contiguous of a relaxed contiguous correlation policy, RC (A, RC (B, C)), that is stored in second datastore 127. Effectively, based on the correlation policy in this example, correlation engine 111 is processing the event data 801 to see if one event A or multiple events A, one event B or multiple events B, and one event C or multiple events C, occur in any order.

Based on the event stream being A, B, C, correlation engine 111 determines that a tree structure formed by A, B, C matches the pattern A, B, C defined by the relaxed contiguous of the relaxed contiguous correlation policy and determines the correlation policy is satisfied, generates an output 803 that indicates the correlation policy is satisfied, and deletes the array comprising values A, B, C.

In this example, correlation engine 111 splits the correlation policy into a tree having a root and leaves, wherein one of the leaves is a sub-tree having a corresponding root and leaves.

Figure 9:
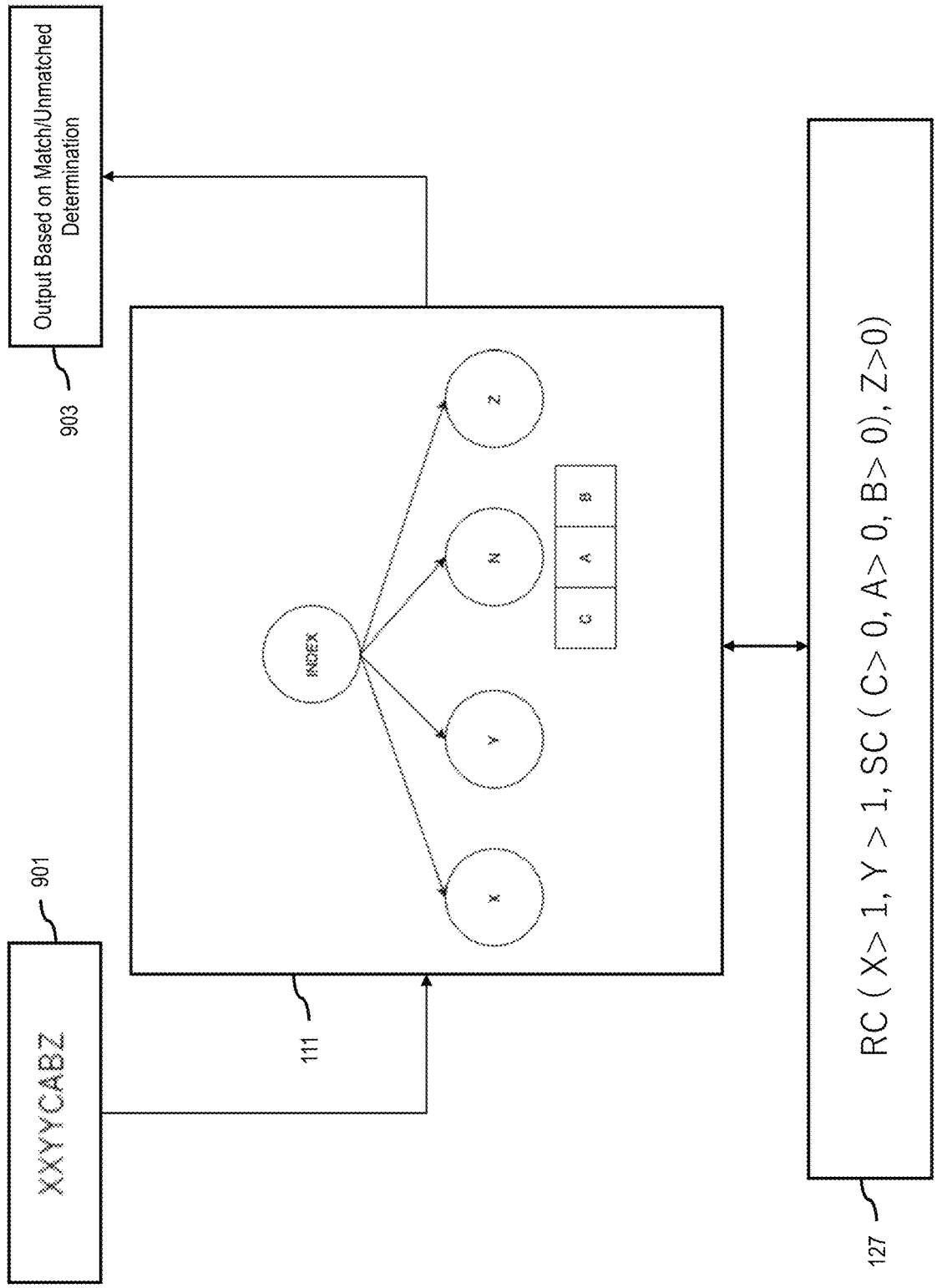
FIG. 9 is a block diagram of an NFAT evaluation, in accordance with some embodiments.

FIG. 9 is a block diagram of an NFAT evaluation 900, in accordance with one or more embodiments.

In NFAT evaluation 900, correlation engine 111 processes event data 901 communicated to correlation engine 111 as discussed with respect to system 100 (FIG. 1). NFAT evaluation 900 is an example demonstrating how correlation engine 111 evaluates received event data 901 which, for simplicity, is discussed with respect to basic example variables "A," "B", "C", "X", "Y", "Z". Event data 901 is merely exemplary for discussion purposes and can be any combination of variables, enriched or not enriched, associated with specific event data received by observability framework 101 (FIG. 1).

In NFAT evaluation 900, event data 901 includes an event stream comprising events X, X, Y, Y, C, A, B, Z. Correlation engine 111 processes the event data according to a relaxed contiguous of a strict contiguous correlation policy, RC (X>1, Y>1, SC (C>0, A>0, B>0), Z>0) that is stored in second datastore 127. Effectively, based on the correlation policy in this example, correlation engine 111 is processing the event data 901 to see if event X occurs more than once, event Y occurs more than once, and event Z occurs at least once in any order, with C, A, B occurring in order without another B intervening C and A and without another C intervening A and B.

Based on the event stream being X, X, Y, Y, C, A, B, Z, correlation engine 111 determines that a NFAT structure (which comprises a tree structure and an array structure) formed by events X, X, Y, Y, C, A, B, Z matches the sought after pattern defined by the relaxed contiguous of a strict contiguous correlation policy and determines the correlation policy is satisfied, generates an output 903 that indicates the correlation policy is satisfied, and deletes the NFAT structure comprising X, X, Y, Y, C, A, B, Z.

Similarly, correlation engine 111 would determine that an event stream C, X, X, A, Y, Y, B, Z would also match the sought after pattern. However, correlation engine 111 would determine that an event stream X, X, A, C, B, Y, Y, Z does not match the sought after pattern (since event A is not between event C and event B, and thus the order defined by the SC policy is not satisfied) and the correlation policy is not satisfied.

Figure 10:
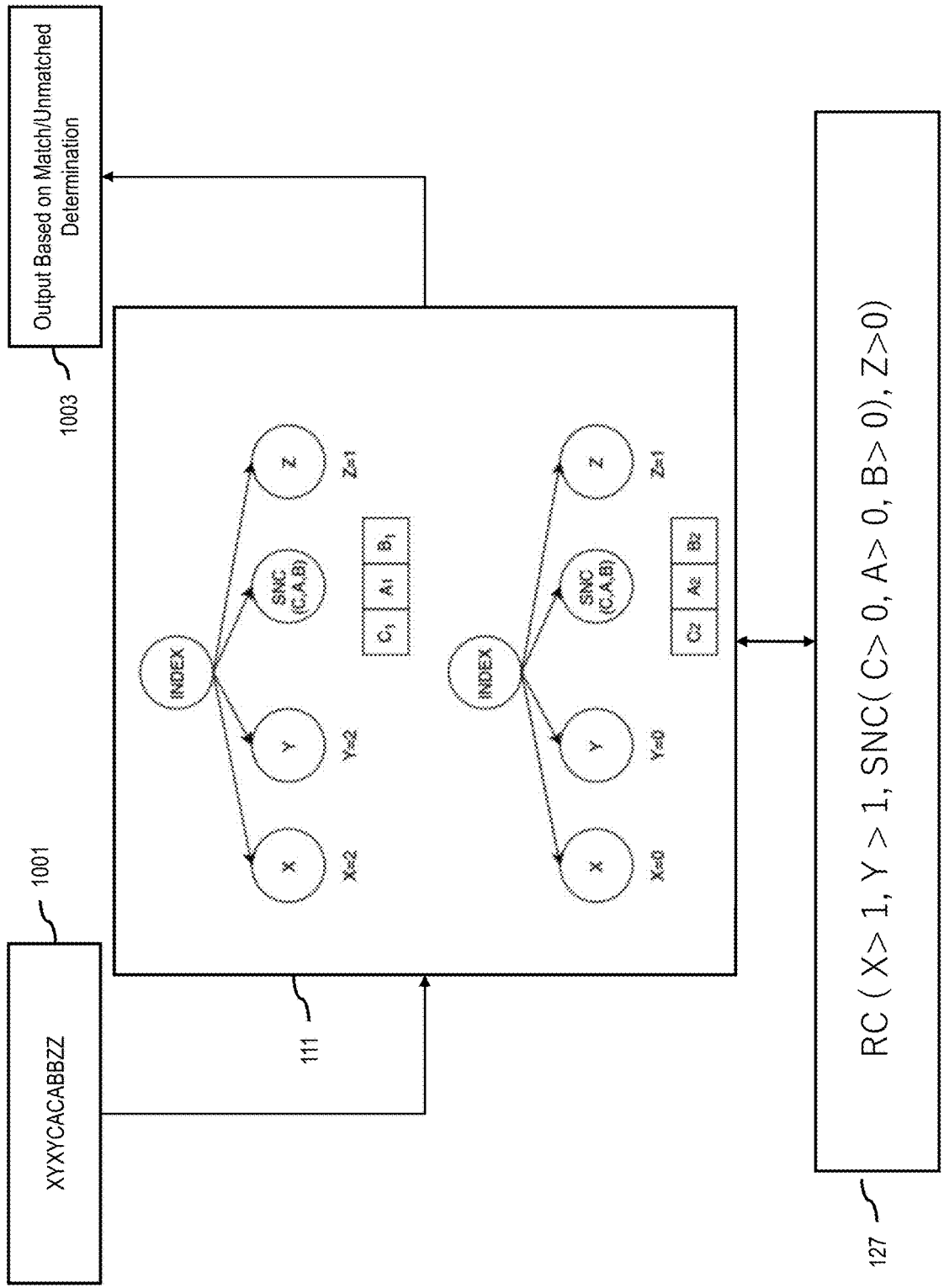
FIG. 10 is a block diagram of an NFAT evaluation, in accordance with some embodiments.

FIG. 10 is a block diagram of an NFAT evaluation 1000, in accordance with one or more embodiments.

In NFAT evaluation 1000, correlation engine 111 processes event data 1001 communicated to correlation engine 111 as discussed with respect to system 100 (FIG. 1). NFAT evaluation 1000 is an example demonstrating how correlation engine 111 evaluates received event data 1001 which, for simplicity, is discussed with respect to basic example variables "A," "B", "C", "X", "Y", "Z". Event data 1001 is merely exemplary for discussion purposes and can be any combination of variables, enriched or not enriched, associated with specific event data received by observability framework 101 (FIG. 1).

In NFAT evaluation 1000, event data 1901 includes an event stream comprising events X,Y,X,Y,C,A,C,A,B,B,Z,Z. Correlation engine 111 processes the event data according to a relaxed contiguous of a strict non-contiguous correlation policy, RC (X>1, Y>1, SNC (C>0, A>0, B>0), Z>0) that is stored in second datastore 127. Effectively, based on the correlation policy in this example, correlation engine 111 is processing the event data 1001 to see if events included in data event data 1001 match a pattern X,Y,X,Y,C,A,C,A,B, B,Z based on the relaxed contiguous and the strict non-contiguous policies.

Based on the event stream being X,Y,X,Y,C,A,C,A,B,B, Z,Z, and the relaxed contiguous of a strict non-contiguous correlation policy in this example, correlation engine 111 splits the processing of the event data and thereby creating a first tree structure comprises of multiple leaves. Subsequently, the correlation engine 111 counts the arrival of first event X and first event Y as $X_1$, $Y_1$, for a first leaf and a second leaf, respectively, and increases the associated count to 1. Then, based on the arrival second event X, and second event Y (e.g., $X_2$, $Y_2$), correlation engine 111 increases the count to 2. Since the X, Y have matched the conditions of "X>1" and "Y>1", respectively, the state in the first leaf and the second leaf is considered to be TRUE. The conditions of "X>1" and "Y>1" defined by the correlation policy will be satisfied.

When a first event C and first event A arrive, these events are added and stored in array 1 of a third leaf in the first tree structure, and when the second event C and second event A arrive, since the conditions of "C>0" and "A>0" are satisfied and it is partially matched in the first array 1, as per non-contiguous principles, a second tree structure comprised of a similar quantity of leaves as the first tree will be created. Subsequently, the second event C and second event A are added to a second array, array 2 in the third leaf of the second tree structure. When the first event B arrives, it will go to the first array, array 1 in the third leaf of the first tree structure, since array 1 is created before array 2 and the condition "B>0" in array 1 has not yet matched, and once the strict pattern is matched, a subsequent B event will go to the second array, array 2 in the third leaf of the second tree structure. When a first event Z arrives, it will go to a fourth leaf of the first tree structure since the first tree structure is created before the second tree structure and the condition "Z>0" in the fourth leaf of the first tree structure has not yet matched. When correlation engine 111 determines the pattern in the first tree structure is fully matched with the conditions defined by the correlation policy, the correlation engine 111 deletes the first tree structure and corresponding event data. In this example, since the conditions in the second array, array 2 of the second tree structure is partially matched, the second tree structure is not deleted unless the pattern is matched and the correlation policy is satisfied, or unless a specific hold time has passed. The correlation engine 111 then causes the second tree structure to become the first tree structure and wait for other events to arrive, continuing the evaluation process until the correlation policy is completely satisfied or until a specific hold-time has passed.

The foregoing examples of NFAT evaluation executed by system 100 (FIG. 1) facilitate simultaneous correlation of policies of multiple events or simultaneous correlation of multiple types of policies, thereby enabling the system 100 to monitor the status of a network that involves multiple network functions and complex conditions.

FIG. 11 is a functional block diagram of a computer or processor-based system 1100 upon which or by which an embodiment is implemented.

Processor-based system 1100 is programmed to manage and/or apply a correlation policy, as described herein, and includes, for example, bus 1101, processor 1103, and memory 1105 components.

In some embodiments, the processor-based system is implemented as a single "system on a chip." Processor-based system 1100, or a portion thereof, constitutes a mechanism for performing one or more steps of managing and/or applying a correlation policy.

In some embodiments, the processor-based system 1100 includes a communication mechanism such as bus 1101 for transferring information and/or instructions among the components of the processor-based system 1100. Processor 1103 is connected to the bus 1101 to obtain instructions for execution and process information stored in, for example, the memory 1105. In some embodiments, the processor 1103 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 1103. Similarly, an ASIC is configurable to perform specialized functions not easily performed by a more general purpose processor. Other specialized components to aid in performing the functions described herein optionally include one or more field programmable gate arrays (FPGA), one or more controllers, or one or more other special-purpose computer chips.

In one or more embodiments, the processor (or multiple processors) 1103 performs a set of operations on information as specified by a set of instructions stored in memory 1105 related to managing and/or applying a correlation policy. The execution of the instructions causes the processor to perform specified functions.

The processor 1103 and accompanying components are connected to the memory 1105 via the bus 1101. The memory 1105 includes one or more of dynamic memory (e.g., RAM, magnetic disk, writable optical disk, etc.) and static memory (e.g., ROM, CD-ROM, etc.) for storing executable instructions that when executed perform the steps described herein to manage and/or apply a correlation policy. The memory 1105 also stores the data associated with or generated by the execution of the steps.

In one or more embodiments, the memory 1105, such as a random access memory (RAM) or any other dynamic storage device, stores information including processor instructions for managing and/or applying a correlation policy. Dynamic memory allows information stored therein to be changed. RAM allows a unit of information stored at a location called a memory address to be stored and retrieved independently of information at neighboring addresses. The memory 1105 is also used by the processor 1103 to store temporary values during execution of processor instructions. In various embodiments, the memory 1105 is a read only memory (ROM) or any other static storage device coupled to the bus 1101 for storing static information, including instructions, that is not capable of being changed by processor 1103. Some memory is composed of volatile storage that loses the information stored thereon when power is lost. In some embodiments, the memory 1105 is a non-volatile (persistent) storage device, such as a magnetic disk, optical disk or flash card, for storing information, including instructions, that persists even when the system 1100 is turned off or otherwise loses power.

The term "computer-readable medium" as used herein refers to any medium that participates in providing information to processor 1103, including instructions for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer can read. The term computer-readable storage medium is used herein to refer to a computer-readable medium.

An aspect of this description is directed to a method comprising processing, by a processor, event data received from an observability framework to detect a status of a network function. The event data is processed based on two or more conditions defined by a correlation policy. The correlation policy comprises a non-deterministic finite automata tree (NFAT) structure correlation policy having a policy type. The method also comprises determining a first value of a first condition of the two or more conditions. The method further comprises determining a second value of a second condition of the two or more conditions. The method additionally comprises determining the policy type of the NFAT structure correlation policy. The method also comprises determining whether the first value is greater than a first preset value indicative of whether the first condition is satisfied. The method further comprises determining whether the second value is greater than a second preset value indicative of whether the second condition is satisfied. The method additionally comprises determining whether the NFAT structure correlation policy is satisfied based on the first value, the second value, and the policy type. The method also comprises causing an operation to occur based on a determination that the NFAT structure correlation policy is satisfied.

In another aspect, an apparatus comprises a processor and a memory having computer readable instructions stored thereon that, when executed by the processor, cause the apparatus to process event data received from an observability framework to detect a status of a network function. The event data is processed based on two or more conditions defined by a correlation policy. The correlation policy comprises a non-deterministic finite automata tree (NFAT) structure correlation policy having a policy type. The apparatus is also caused to determine a first value of a first condition of the two or more conditions. The apparatus is further caused to determine a second value of a second condition of the two or more conditions. The apparatus is additionally caused to determine the policy type of the NFAT structure correlation policy. The apparatus is also caused to determine whether the first value is greater than a first preset value indicative of whether the first condition is satisfied. The apparatus is further caused to determine whether the second value is greater than a second preset value indicative of whether the second condition is satisfied. The apparatus is additionally caused to determine whether the NFAT structure correlation policy is satisfied based on the first value, the second value, and the policy type. The apparatus is also caused to cause an operation to occur based on a determination that the NFAT structure correlation policy is satisfied.

In another aspect, a non-transitory computer-readable storage medium includes instructions that, when executed by a processor, cause an apparatus to cause to process event data received from an observability framework to detect a status of a network function. The event data is processed based on two or more conditions defined by a correlation policy. The correlation policy comprises a non-deterministic finite automata tree (NFAT) structure correlation policy having a policy type. The apparatus is also caused to determine a first value of a first condition of the two or more conditions. The apparatus is further caused to determine a second value of a second condition of the two or more conditions. The apparatus is additionally caused to determine the policy type of the NFAT structure correlation policy. The apparatus is also caused to determine whether the first value is greater than a first preset value indicative of whether the first condition is satisfied. The apparatus is further caused to determine whether the second value is greater than a second preset value indicative of whether the second condition is satisfied. The apparatus is additionally caused to determine whether the NFAT structure correlation policy is satisfied based on the first value, the second value, and the policy type. The apparatus is also caused to cause an operation to occur based on a determination that the NFAT structure correlation policy is satisfied.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   processing, by a processor, event data received from an observability framework to detect a status of a network function, the event data being processed based on two or more conditions defined by a correlation policy, wherein the correlation policy comprises a non-deterministic finite automata tree (NFAT) structure correlation policy having a policy type;

determining a first value of a first condition of the two or more conditions;

determining a second value of a second condition of the two or more conditions;

determining the policy type of the NFAT structure correlation policy;

determining whether the first value is greater than a first preset value indicative of whether the first condition is satisfied;

determining whether the second value is greater than a second preset value indicative of whether the second condition is satisfied;

determining whether the NFAT structure correlation policy is satisfied based on the first value, the second value, and the policy type; and causing an operation to occur based on a determination that the NFAT structure correlation policy is satisfied.

2. The method of claim 1, wherein determining the policy type of the NFAT structure correlation policy comprises determining whether the policy type of the NFAT structure correlation policy is a strict contiguous (SC) policy, a strict non-contiguous (SNC) policy, a relaxed contiguous (RC) policy, a relaxed non-contiguous (RNC) policy, or a combination thereof.

3. The method of claim 2, wherein based on a determination that the policy type is at least one of the SC policy of the SNC policy, the method further comprising:

determining an order of the two or more conditions; and
determining an order of the first condition and the second condition among the two or more conditions;

wherein the step of determining whether the NFAT structure correlation policy is satisfied comprises determining whether the NFAT structure correlation policy is satisfied based on the first value, the second value, the order of the first condition and the second condition, and the policy type.

4. The method of claim 1, wherein the method further comprises:

processing the event data for a predefined hold time until the NFAT structure correlation policy is satisfied or the predefined hold time is expired; and based on a determination that the NFAT structure correlation policy cannot be satisfied during the predefined hold time, causing at least a portion of the event data to be discarded.

5. The method of claim 4, further comprising:

causing the event data to be discarded after the predefined hold time based on a determination that the NFAT structure correlation policy is satisfied by the end of the predefined hold time; and detecting the status of the network function based on new event data and the NFAT structure correlation policy for a subsequent predefined hold time after the predefined hold time.

6. The method of claim 4, wherein the predefined hold time is a validity time of the determined first value, and the method further comprises:

determining the first value is greater than the first preset value;

processing the event data to determine whether the second condition is satisfied during the hold time; and causing the first value to be discarded after the predefined hold time based on a determination that the second condition is not satisfied by the end of the predefined hold time.

7. The method of claim 4, wherein the operation is caused to occur after the end of the predefined hold time based on a determination that the NFAT structure correlation policy is satisfied during the predefined hold time.

8. The method of claim 1, wherein the method further comprises:

processing the event data for a predefined hold time until the NFAT structure correlation policy is satisfied or the predefined hold time is expired; and based on a determination that the NFAT structure correlation policy cannot be satisfied during the predefined hold time, adjusting the predefined hold time to facilitate processing the event data until the NFAT structure correlation policy is satisfied.

9. The method of claim 1, wherein the method further comprises:

causing the event data to be discarded based on a determination that the NFAT structure correlation policy is satisfied; and detecting the status of the network function based on new event data and the NFAT structure correlation policy after the NFAT structure correlation policy is determined to be satisfied.

10. The method of claim 1, wherein the status of the network function is an operation state of a node in a communication network, and the operation comprises an alarm indicating the network node is inoperative and at least a portion of the communication network is down.

11. The method of claim 10, wherein the operation further comprises healing the communication network by fixing or circumventing the network node that is inoperative.

12. An apparatus, comprising:

a processor; and a memory having computer readable instructions stored thereon that, when executed by the processor, cause the apparatus to:

process event data received from an observability framework to detect a status of a network function, the event data being processed based on two or more conditions defined by a correlation policy, wherein the correlation policy comprises a non-deterministic finite automata tree (NFAT) structure correlation policy having a policy type;

determine a first value of a first condition of the two or more conditions;

determine a second value of a second condition of the two or more conditions;

determine the policy type of the NFAT structure correlation policy;

determine whether the first value is greater than a first preset value indicative of whether the first condition is satisfied;

determine whether the second value is greater than a second preset value indicative of whether the second condition is satisfied;

determine whether the NFAT structure correlation policy is satisfied based on the first value, the second value, and the policy type; and cause an operation to occur based on a determination that the NFAT structure correlation policy is satisfied.

13. The apparatus of claim 12, wherein the policy type of the NFAT structure correlation policy is determined to be a strict contiguous (SC) policy, a strict non-contiguous (SNC)

policy, a relaxed contiguous (RC) policy, a relaxed noncontiguous (RNC) policy, or a combination thereof.

14. The apparatus of claim 13, wherein based on a determination that the policy type is at least one of the SC policy or the SNC policy, the apparatus is further caused to:
   determine an order of the two or more conditions; and
   determine an order of the first condition and the second condition among the two or more conditions;
   wherein the NFAT structure correlation policy is determined to be satisfied based on the first value, the second value, the order of the first condition and the second condition, and the policy type.

15. The apparatus of claim 12, wherein the apparatus is further caused to:
   process the event data for a predefined hold time until the NFAT structure correlation policy is satisfied or the predefined hold time is expired; and
   based on a determination that the correlation policy cannot be satisfied during the predefined hold time, cause at least a portion of the event data to be discarded.

16. The apparatus of claim 15, wherein the apparatus is further caused to:
   cause the event data to be discarded after the predefined hold time based on a determination that the correlation policy is satisfied by the end of the predefined hold time; and
   detect the status of the network function based on new event data and the correlation policy for a subsequent predefined hold time after the predefined hold time.

17. The apparatus of claim 12, wherein the apparatus is further caused to:
   process the event data for a predefined hold time until the NFAT structure correlation policy is satisfied or the predefined hold time is expired; and
   based on a determination that the correlation policy cannot be satisfied during the predefined hold time, adjust the predefined hold time to facilitate processing the event data until the correlation policy is satisfied.

18. A non-transitory computer readable medium having instructions stored thereon that, when executed by a processor, cause an apparatus to:
   process event data received from an observability framework to detect a status of a network function, the event data being processed based on two or more conditions defined by a correlation policy, wherein the correlation policy comprises a non-deterministic finite automata tree (NFAT) structure correlation policy having a policy type;
   determine a first value of a first condition of the two or more conditions;
   determine a second value of a second condition of the two or more conditions;
   determine the policy type of the NFAT structure correlation policy;
   determine whether the first value is greater than a first preset value indicative of whether the first condition is satisfied;
   determine whether the second value is greater than a second preset value indicative of whether the second condition is satisfied;
   determine whether the NFAT structure correlation policy is satisfied based on the first value, the second value, and the policy type; and
   cause an operation to occur based on a determination that the NFAT structure correlation policy is satisfied.

19. The non-transitory computer readable medium of claim 18, wherein the policy type of the NFAT structure correlation policy is determined to be a strict contiguous (SC) policy, a strict non-contiguous (SNC) policy, a relaxed contiguous (RC) policy, a relaxed non-contiguous (RNC) policy, or a combination thereof.

20. The non-transitory computer readable medium of claim 19, wherein based on a determination that the policy type is at least one of the SC policy or the SNC policy, the apparatus is further caused to:
   determine an order of the two or more conditions; and
   determine an order of the first condition and the second condition among the two or more conditions;
   wherein the NFAT structure correlation policy is determined to be satisfied based on the first value, the second value, the order of the first condition and the second condition, and the policy type.

* * * * *